(12) United States Patent
Furutani et al.

(10) Patent No.: US 9,710,298 B2
(45) Date of Patent: Jul. 18, 2017

(54) INFORMATION PROCESSING SYSTEM, STORAGE APPARATUS, AND PROGRAM

(71) Applicant: FUJITSU LIMITED, Kawasaki-shi, Kanagawa (JP)

(72) Inventors: Naoki Furutani, Kawasaki (JP); Toshihide Yanagawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 28 days.

(21) Appl. No.: 14/837,006

(22) Filed: Aug. 27, 2015

(65) Prior Publication Data

US 2016/0077861 A1    Mar. 17, 2016

(30) Foreign Application Priority Data

Sep. 11, 2014    (JP) .................................. 2014-184740

(51) Int. Cl.
*G06F 9/455*    (2006.01)
*G06F 3/06*    (2006.01)

(52) U.S. Cl.
CPC ........ *G06F 9/45558* (2013.01); *G06F 3/0601* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 9,032,248 B1 * | 5/2015 | Petty | G06F 11/2038 714/11 |
| 2005/0223271 A1 | 10/2005 | Butterworth et al. | |
| 2012/0072687 A1 | 3/2012 | Hiraiwa et al. | |
| 2012/0151250 A1 * | 6/2012 | Saika | G06F 11/1417 714/4.11 |
| 2012/0221729 A1 * | 8/2012 | Hara | G06F 3/0605 709/226 |
| 2014/0317438 A1 * | 10/2014 | Ripoll | G06F 11/2035 714/4.11 |

FOREIGN PATENT DOCUMENTS

| | | |
|---|---|---|
| JP | 2006-508458 | 3/2006 |
| JP | 2012-064012 | 3/2012 |
| WO | 2004/051476 | 6/2004 |

\* cited by examiner

*Primary Examiner* — Sisley Kim
(74) *Attorney, Agent, or Firm* — Fujitsu Patent Center

(57) ABSTRACT

An information processing system includes a first storage apparatus that includes first storage regions accessible by first virtual machines disposed in a first physical machine, and a second storage apparatus that includes second storage regions accessible by second virtual machines disposed in a second physical machine, wherein, when the second virtual machines execute first processing executed by the first virtual machines, the second storage apparatus stores first information in which information for identifying virtual machines that execute the first processing among the second virtual machines and information for identifying storage regions accessed by the identified virtual machines during the execution of the first processing among the second storage regions are associated with each other, and the first storage apparatus reconfigures a configuration of the first storage regions to be same as a configuration of a storage region corresponding to the first information among the second storage regions.

7 Claims, 23 Drawing Sheets

FIG.17

| GROUP IDENTIFICATION ID | PRIMARY PHYSICAL MACHINE ID | PRIMARY VIRTUAL MACHINE ID | SECONDARY PHYSICAL MACHINE ID | SECONDARY VIRTUAL MACHINE ID |
|---|---|---|---|---|
| 1 | SV-1-1 | VM-1-1 | SV-2-1 | VM-2-1 |
| 2 | SV-1-1 | VM-1-2 | SV-2-1 | VM-2-2 |
| 3 | SV-1-1 | VM-1-3 | SV-2-2 | VM-2-3 |
| 4 | SV-1-1 | VM-1-4 | SV-2-3 | VM-2-4 |

FIG.18

| GROUP IDENTIFICATION ID | SECONDARY VOLUME |
|---|---|
| 1 | Vol-1-1-2 |
|  | Vol-1-2-2 |
|  | Vol-1-3-2 |
| 2 | Vol-2-1-2 |
| 3 | Vol-3-1-2 |
|  | Vol-3-2-2 |
| 4 | Vol-4-1-2 |
|  | Vol-4-2-2 |

FIG.19

| GROUP IDENTIFICATION ID | SECONDARY VOLUME |
|---|---|
| 1 | Vol-1-1-2 |
| | Vol-1-3-2 |
| | Vol-1-4-2 |
| 2 | Vol-2-1-2 |
| 3 | Vol-3-1-2 |
| 4 | Vol-4-1-2 |
| | Vol-4-2-2 |

FIG.22A

| GROUP IDENTIFICATION ID | PRIMARY VOLUME | SECONDARY VOLUME |
|---|---|---|
| 1 | Vol-1-1-1 | Vol-1-1-2 |
|   | Vol-1-2-1 | Vol-1-2-2 |
|   | Vol-1-3-1 | Vol-1-3-2 |
| 2 | Vol-2-1-1 | Vol-2-1-2 |
| 3 | Vol-3-1-1 | Vol-3-1-2 |
|   | Vol-3-2-1 | Vol-3-2-2 |
| 4 | Vol-4-1-1 | Vol-4-1-2 |
|   | Vol-4-2-1 | Vol-4-2-2 |

FIG.22B

| GROUP IDENTIFICATION ID | PRIMARY VOLUME | SECONDARY VOLUME |
|---|---|---|
| 1 | Vol-1-1-1 | Vol-1-1-2 |
|   | Vol-1-2-1 | Vol-1-2-2 |
|   | Vol-1-3-1 | Vol-1-3-2 |
| 2 | Vol-2-1-1 | Vol-2-1-2 |
| 3 | Vol-3-1-1 | Vol-3-1-2 |
|   | Vol-3-2-1 | Vol-3-2-2 |
| 4 | Vol-4-1-1 | Vol-4-1-2 |
|   | Vol-4-2-1 | Vol-4-2-2 |

FIG.23A

| GROUP IDENTIFICATION ID | PRIMARY VOLUME | SECONDARY VOLUME |
|---|---|---|
| 1 | Vol-1-1-1 | Vol-1-1-2 |
|   | Vol-1-2-1 | Vol-1-2-2 |
|   | Vol-1-3-1 | Vol-1-3-2 |
| 2 | Vol-2-1-1 | Vol-2-1-2 |
| 3 | Vol-3-1-1 | Vol-3-1-2 |
|   | Vol-3-2-1 | Vol-3-2-2 |
| 4 | Vol-4-1-1 | Vol-4-1-2 |
|   | Vol-4-2-1 | Vol-4-2-2 |

FIG.23B

| GROUP IDENTIFICATION ID | PRIMARY VOLUME | SECONDARY VOLUME |
|---|---|---|
| 1 | Vol-1-1-1 | Vol-1-1-2 |
|   | Vol-1-2-1 |  |
|   | Vol-1-3-1 | Vol-1-3-2 |
|   |  | Vol-1-4-2 |
| 2 | Vol-2-1-1 | Vol-2-1-2 |
| 3 | Vol-3-1-1 | Vol-3-1-2 |
|   | Vol-3-2-1 |  |
| 4 | Vol-4-1-1 | Vol-4-1-2 |
|   | Vol-4-2-1 | Vol-4-2-2 |

INFORMATION PROCESSING SYSTEM, STORAGE APPARATUS, AND PROGRAM

CROSS-REFERENCE TO RELATED APPLICATION

This application is based upon and claims the benefit of priority of the prior Japanese Patent Application No. 2014-184740, filed on Sep. 11, 2014, the entire contents of which are incorporated herein by reference.

FIELD

The present invention relates to an information processing system, a storage apparatus, and a program.

BACKGROUND

For example, in a job system that provides users with services, a server (hereinafter also referred to as standby server) that can execute processing same as processing operating in a server in operation (hereinafter also referred to as operation server) is sometimes prepared. The standby server is set in, for example, a data center present in a place approximately several ten kilometers to several hundred kilometers away from a data center where the operation server is set. Consequently, for example, when it is difficult to continue processing in the operation server because of occurrence of a natural disaster or the like, it is possible to cause the standby server to execute the processing executed by the operation server and continue provision of services to users. After the restoration of the operation server is completed, for example, an operation administrator causes the operation server to re-execute the processing executed by the standby server (see, for example, Japanese Laid-open Patent Publication No. 2012-64012 and Japanese National Publication of International Patent Application No. 2006-508458).

SUMMARY

The operation administrator sometimes configures, for example, a storage apparatus accessed by the standby server (hereinafter also referred to as standby side storage apparatus) the same as a storage apparatus accessed by the operation server (hereinafter referred to as operation side storage apparatus). The operation administrator sometimes synchronizes, for example, data in the storage apparatuses at a predetermined interval (e.g., once a day). In this case, when a failure occurs in the operation server, it is possible to quickly start processing in the standby server.

During the execution of the processing in the standby server (when the failure occurs in the operation server), the configuration in the standby side storage apparatus is sometimes changed according to the execution of the processing in the standby server. Specifically, for example, storage of data in a new volume is started because a free space of a certain volume in the standby side storage apparatus is exhausted. Therefore, in this case, the operation administrator needs to update the configuration of the operation side storage apparatus on the basis of information concerning the configuration in the standby side storage apparatus.

However, for example, when the operation server updates the configuration of the operation side storage apparatus on the basis of the information concerning the configuration in the standby side storage apparatus, the configuration of the operation side storage apparatus is not updated until the restoration of the operation server is completed. Therefore, for example, even when the operation side storage apparatus is restored earlier than the operation server or when a failure does not occur in the operation side storage apparatus, the configuration of the operation side storage apparatus is unable to be updated until the operation server is restored.

For example, when the standby server is performing original processing (processing not executed by the operation server), information concerning the original processing in the standby server is sometimes included in the information concerning the configuration in the standby side storage apparatus acquired by the operation side storage apparatus. Therefore, when updating the configuration of the operation side storage apparatus on the basis of the acquired information concerning the configuration in the standby side storage apparatus, the operation side storage apparatus sometimes creates a storage region not needed by the operation server.

According to an aspect of the embodiments, an information processing system includes a first storage apparatus that includes first storage regions accessible by first virtual machines disposed in a first physical machine, and a second storage apparatus that includes second storage regions accessible by second virtual machines disposed in a second physical machine, wherein in accordance with occurrence of predetermined abnormality in the first virtual machines or the first storage apparatus, when the second virtual machines execute first processing executed by the first virtual machines, the second storage apparatus stores first information in which information for identifying virtual machines that execute the first processing among the second virtual machines and information for identifying storage regions accessed by the identified virtual machines during the execution of the first processing among the second storage regions are associated with each other, and before the first virtual machines re-execute the first processing, the first storage apparatus reconfigures a configuration of the first storage regions to be same as a configuration of a storage region corresponding to the first information among the second storage regions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is a diagram for explaining the details of the reconfiguration processing in the first embodiment.

FIG. 18 is a diagram for explaining the details of the reconfiguration processing in the first embodiment.

FIG. 19 is a diagram for explaining the details of the reconfiguration processing in the first embodiment.

FIGS. 22A to 22B are diagrams for explaining specific examples of the correspondence information 1532 and 2532.

FIGS. 23A to 23B are diagrams for explaining specific examples of the correspondence information 1532 and 2532.

DESCRIPTION OF EMBODIMENTS

Configuration of an Information Processing System

Figure 1:
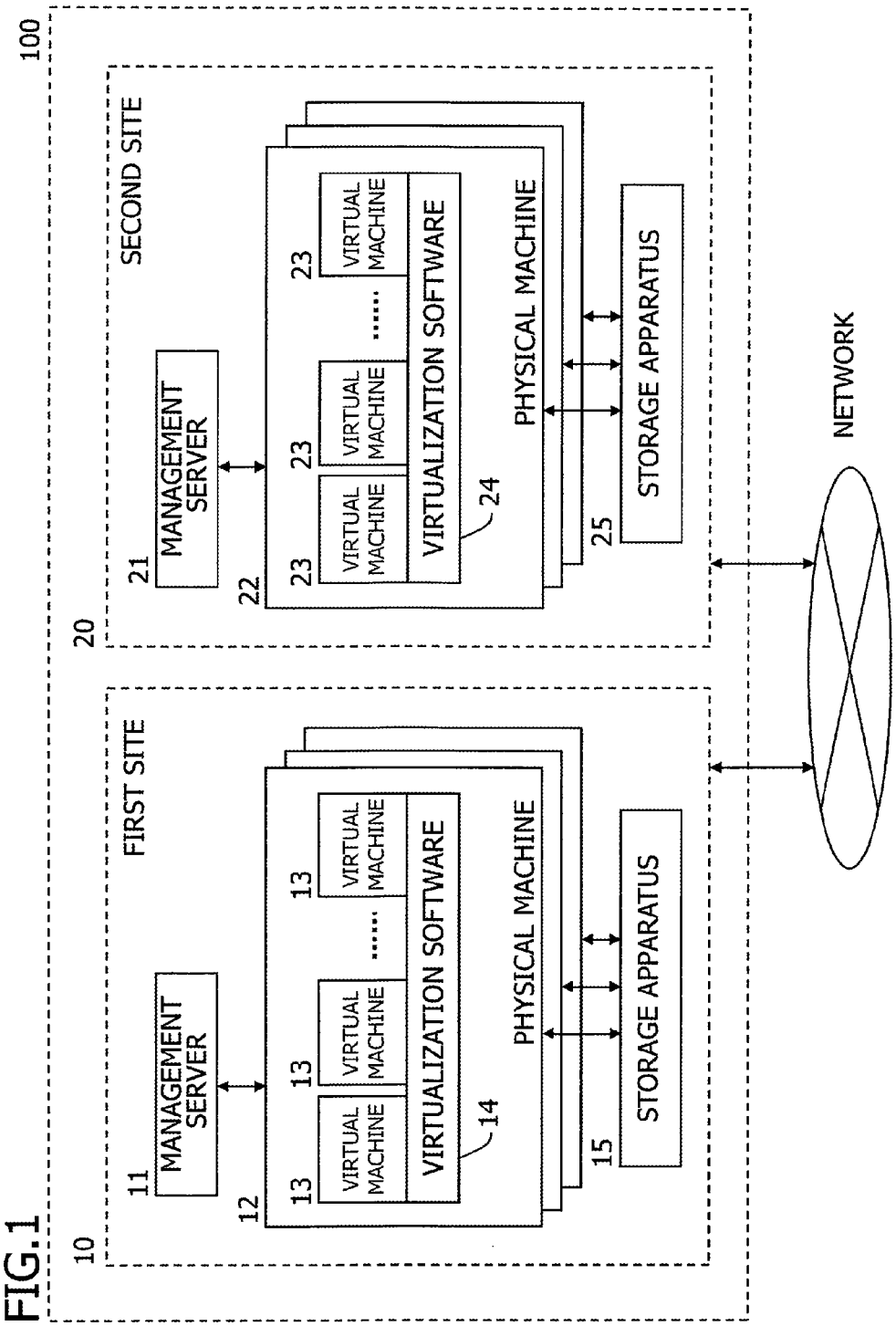
FIG. 1 is a diagram depicting the overall configuration of an information processing system.

FIG. 1 is a diagram depicting the overall configuration of an information processing system. An information processing system 100 depicted in FIG. 1 is configured by physical machines and the like respectively set in a first site 10 and a second site 20. The first site 10 and the second site 20 are, for example, sites present in places several ten kilometers to several hundred kilometers away from each other.

In the first site 10, for example, a management server 11, a physical machine 12 that creates virtual machines (VM), and a storage apparatus 15 (hereinafter also referred to as first storage apparatus 15) including storage regions (hereinafter also referred to as volumes) accessible by the virtual machines and the like are provided. In the second site 20, for example, a management server 21, a physical machine 22 that creates virtual machines, and a storage apparatus 25 (hereinafter also referred to as second storage apparatus 25) including volumes accessible by the virtual machines and the like are provided. The apparatuses in the first site 10 and the apparatuses in the second site 20 are accessible to each other via a network such as the Internet or an intranet.

In an example depicted in FIG. 1, the physical machines 12 and 22 are configured from a plurality of physical machines. The physical machines include central processing units (CPUs), random access memories (RAMs), large-capacity memories such as hard disks (hard disk drives (HDDs)), and networks. Resources of the physical machines 12 and 22 are respectively allocated to a plurality of virtual machines 13 and 23.

For example, the management servers 11 and 21 are respectively accessible to the physical machines 12 and 22 and perform management of creation instructions for virtual machines and created virtual machines.

A service provider provides users with, for example, an infrastructure and the like of the virtual machines 13 and 23 (hereinafter respectively also referred to as first virtual machines 13 and second virtual machines 23) through a network (hereinafter also referred to as cloud service). The cloud service is a service for providing, through the network, a base for establishing and operating a computer system, that is, an infrastructure itself such as virtual machines and networks. A user accesses, for example, a cloud service portal site from a user terminal and selects specifications needed for virtual machines, for example, a clock frequency of a CPU, a capacity (GB) of a memory, a capacity (MB/sec, IOPS) of a hard disk, and a communication band width (Gbps) of a network. The user enters into a cloud service use agreement concerning the specifications. The user terminal enables, for example, monitoring of operation states of the virtual machines and operation for the virtual machines.

Note that, for example, at normal time, the virtual machines 13 in the first site 10 perform services for providing the users with services and the virtual machines 23 in the second site 20 perform other processing (e.g., processing for analyzing states of use of the services by the users). When abnormality occurs in the virtual machines 13 in the first site 10 because of, for example, occurrence of a disaster, the virtual machines 23 take over and execute processing executed by the virtual machines 13 to thereby continue the provision of the services to the users. Thereafter, when the virtual machines 13 are restored, for example, the virtual machines 13 resume the execution of the processing performed by the virtual machines 23. Therefore, in the example depicted in FIG. 1, the apparatuses in the second site 20 have environments in which kinds of processing executed by the apparatuses in the first site 10 can be executed. Specifically, for example, computer programs and the like operating in the virtual machines 13 are installed in the virtual machines 23. Data stored in the storage apparatus 25 and data stored in the storage apparatus 15 are synchronized.

When the virtual machines 23 in the second site 20 perform original processing (processing not executed by the virtual machines 13), the virtual machines 13 install in advance computer programs and the like operating in the virtual machines 23. Consequently, when abnormality occurs in the virtual machines 23 in the second site 20 because of, for example, occurrence of a disaster, the virtual machines 13 can take over and execute processing executed in the virtual machines 23.

Virtualization software 14 and virtualization software 24 are kinds of base software that respectively allocate, according to instructions from the management servers 11 and 21, resources such as CPUs, memories, hard disks, and networks of the physical machines 12 and 22 to thereby operate the virtual machines 13 and 23. The virtualization software 14 and the virtualization software 24 respectively operate in, for example, the physical machines 12 and 22.

In addition to being respectively allocated with the resources of the physical machines 12 and 22, the virtual machines 13 and 23 include, in the hard disks thereof, for example, image files having operating systems (OSs), middleware, applications, databases, and the like. The virtual machines 13 and 23 write, for example, the image files in the memories from the hard disks during a start and perform operations corresponding to a desired service.

Configurations of the Physical Servers and the Storage Apparatuses

The configuration of the storage apparatuses is explained. FIGS. 2 to 8 are diagrams for explaining the configuration of the storage apparatuses. Note that, in the following example, it is assumed that the first site 10 is an operation site that executes processing at the normal time and the second site 20 is a standby site that takes over processing executed by the first site 10 when abnormality occurs in the first site 10.

Figure 2:
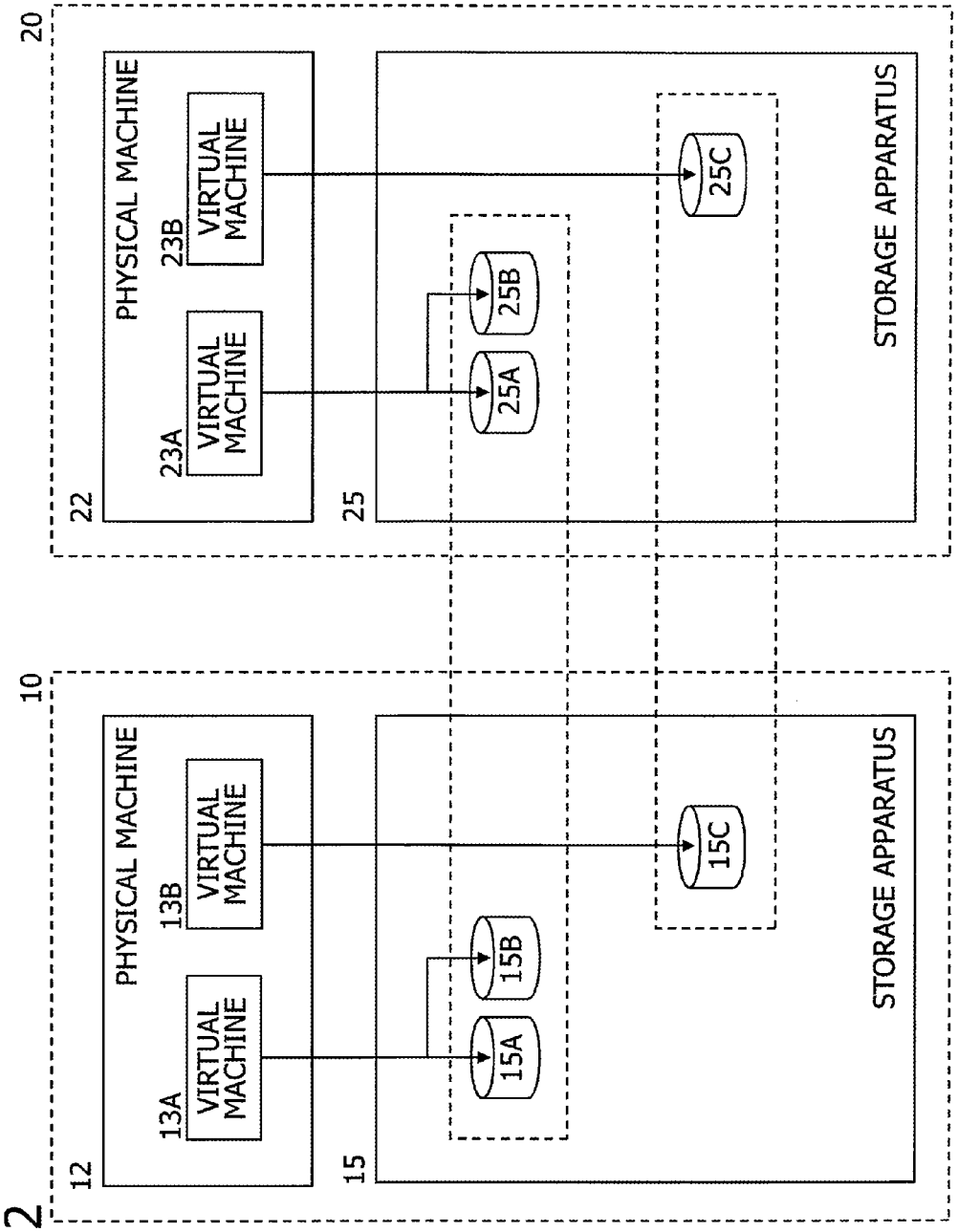
FIG. 2 is a diagram for explaining the configuration of the storage apparatuses.

FIG. 2 is a diagram for explaining the configurations of the physical servers and the storage apparatuses during normal operation. In an example depicted in FIG. 2, a virtual machine 23A of the second site 20 is capable of executing processing operating in a virtual machine 13A of the first site 10. A virtual machine 23B of the second site 20 is capable of executing processing operating in the virtual machine 13B of the first site 10. Volumes in the storage apparatus 15 accessible by the virtual machines 13A and 13B and volumes in the storage apparatus 25 accessible by the virtual machines 23A and 23B are synchronized with each other. Specifically, in the example depicted in FIG. 2, data stored in volumes 15A and 15B accessible by the virtual machine 13A is synchronized with data stored in volumes 25A and 25B accessible by the virtual machine 23A. In the example depicted in FIG. 2, data stored in a volume 15C accessible by the virtual machine 13B is synchronized with data stored in a volume 25C accessible by the virtual machine 23B. Consequently, when abnormality occurs in the virtual machines 13A and 13B because of, for example, occurrence of a disaster, the virtual machines 23A and 23B do not need to synchronize the data stored in the volumes 15A and 15B and the data stored in the volumes 25A and 25B. Therefore, when abnormality occurs in the virtual machines 13A and 13B, the virtual machines 23A and 23B can quickly start processing performed by the virtual machines 13A and 13B. Specific processing performed when abnormality occurs in the virtual machines 13A and 13B because of, for example, occurrence of a disaster is explained below.

Processing Performed When a Disaster or the Like Occurs

Figure 3:
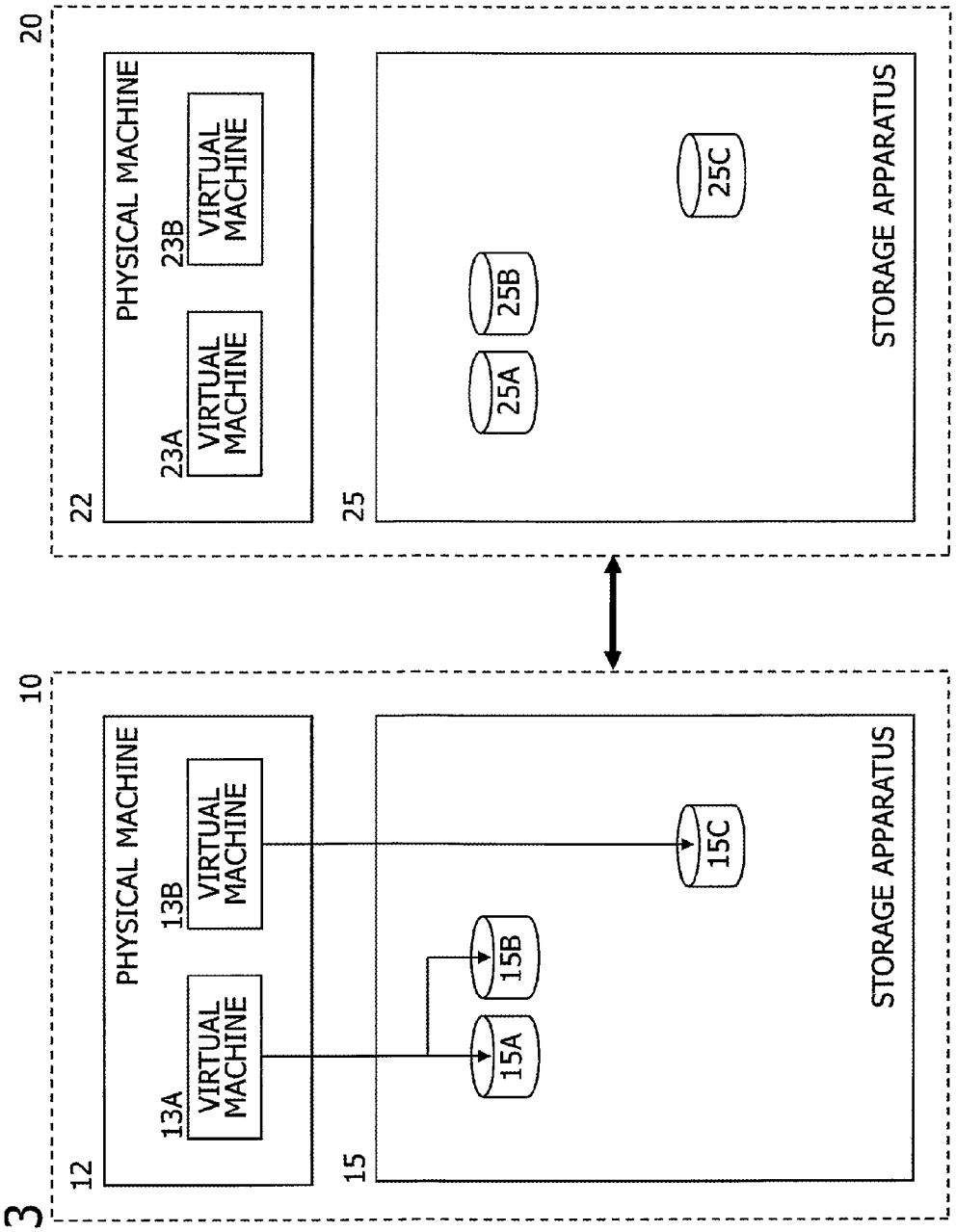
FIG. 3 is a diagram for explaining the configuration of the storage apparatuses.

FIG. 3 is a diagram for explaining the configurations of the physical machines and the virtual machines before abnormality occurrence. FIGS. 4 to 7 are diagrams for explaining processing performed when abnormality occurs in the virtual machines.

In an example depicted in FIG. 3, the virtual machine 13A accesses the volumes 15A and 15B according to execution of the processing. The virtual machine 13B accesses the volume 15C according to the execution of the processing. In a state depicted in FIG. 3, the virtual machines 23A and 23B are not executing processing performed by the virtual machines 13A and 13B. Therefore, in the example depicted in FIG. 3, the virtual machines 23A and 23B are not accessing the volumes 25A, 25B, and 25C.

Figure 4:
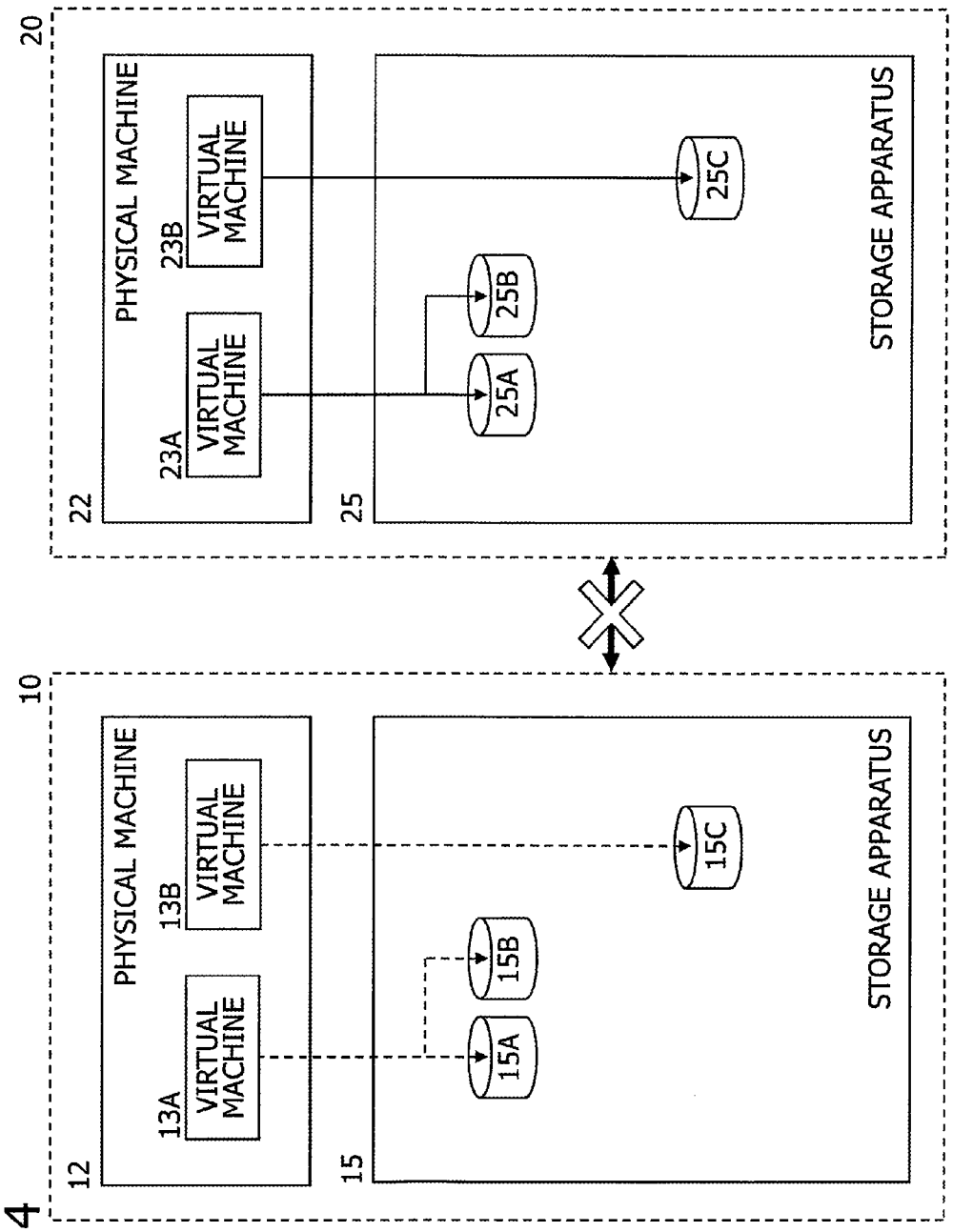
FIG. 4 is a diagram for explaining the configuration of the storage apparatuses.

In the state depicted in FIG. 3, when abnormality occurs in the virtual machines 13A and 13B, for example, the virtual machines 23A and 22B detect that the virtual machines 13A and 13B become inaccessible to thereby determine that the abnormality has occurred in the virtual machines 13A and 13B. In this case, as depicted in FIG. 4, the virtual machines 23A and 23B respectively take over and execute kinds of processing executed by the virtual machines 13A and 13B. Specifically, the virtual machine 23A accesses the volumes 25A and 25B synchronized with the volumes 15A and 15B and performs processing. The virtual machine 23B accesses the volume 25C synchronized with the volume 15C and performs processing. Consequently, when, for example, a disaster occurs, it is possible to continuously provide services to the users.

Figure 5:
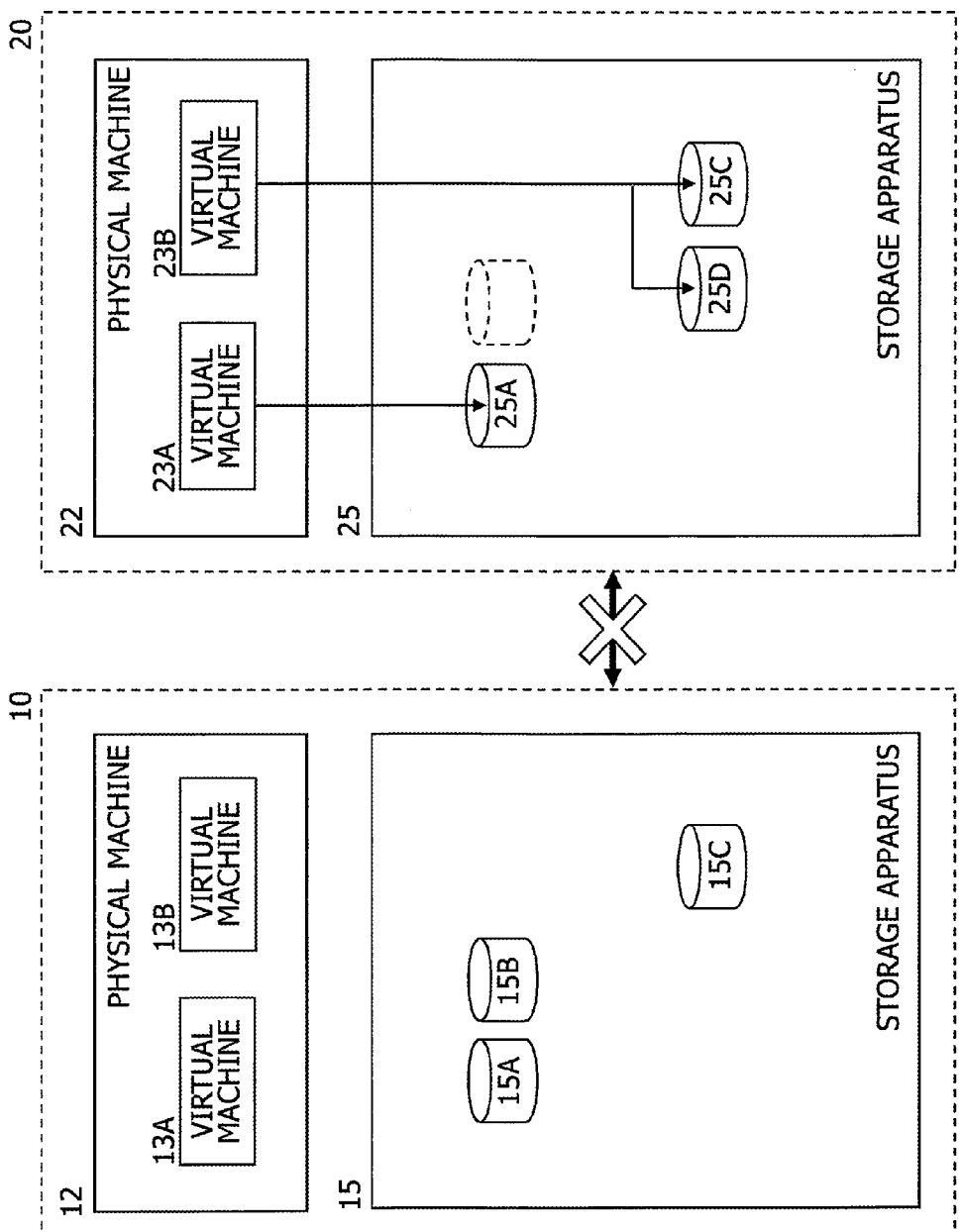
FIG. 5 is a diagram for explaining the configuration of the storage apparatuses.
Figure 6:
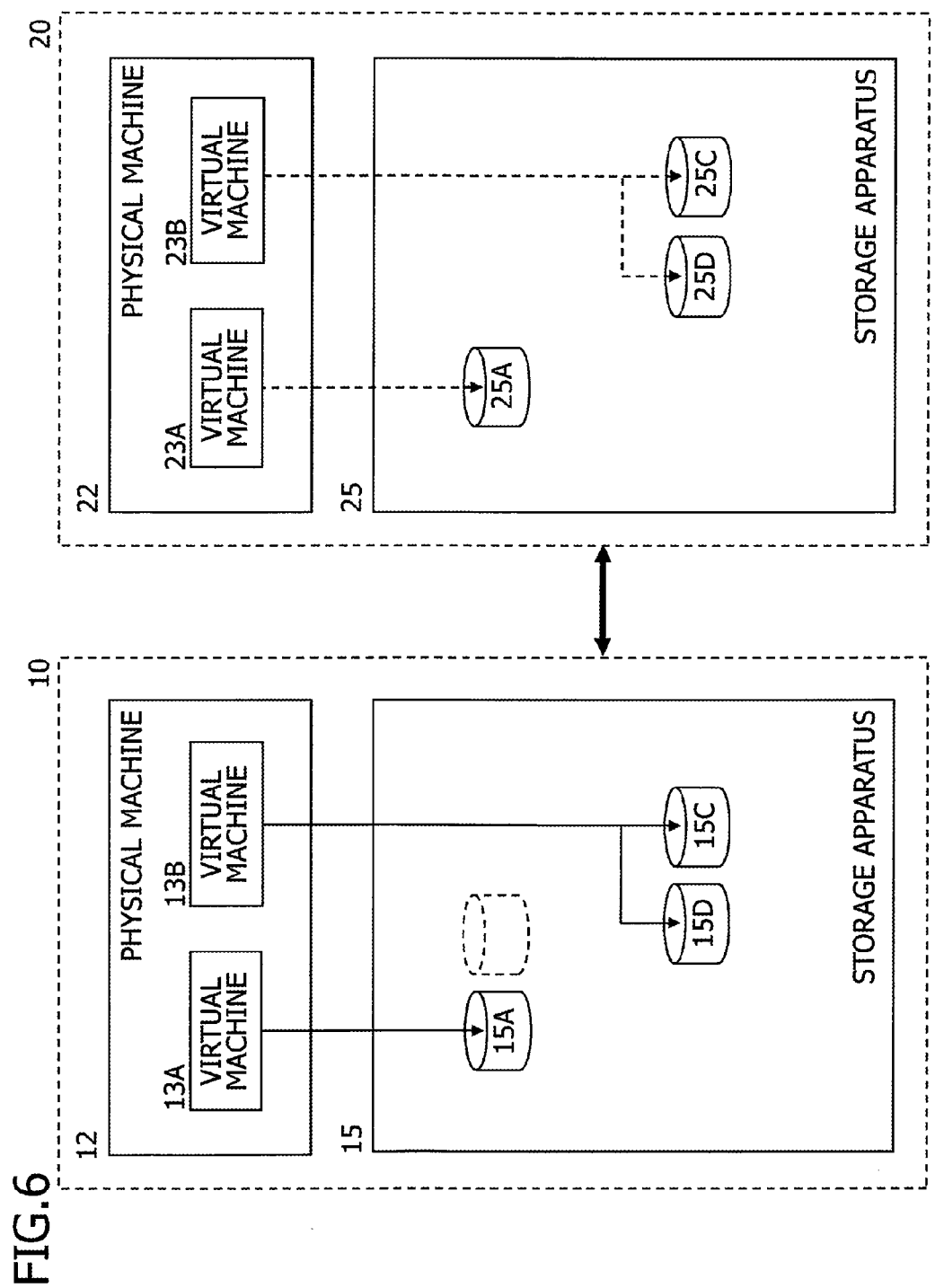
FIG. 6 is a diagram for explaining the configuration of the storage apparatuses.

For example, when the abnormality occurs in the virtual machines 13A and 13B, if restoration work takes time, the virtual machines 23A and 23B consume long time to execute the processing executed by the virtual machines 13A and 13B. In this case, as depicted in FIG. 5, according to the execution of the processing by the virtual machines 23A and 23B, the configuration of volumes in the storage apparatus 25 accessed by the virtual machines 23A and 23B is sometimes changed. That is, in this case, the configuration of volumes accessed by the virtual machines 13A and 13B according to the execution of the processing before the abnormality occurrence and the configuration of volumes currently accessed by the virtual machines 23A and 23B are different. Specifically, in an example depicted in FIG. 5, differently from the state depicted in FIG. 4, the virtual machine 23A accesses only the volume 25A and the virtual machine 23B accesses the volume 25C and the volume 25D. Therefore, when the virtual machines 13A and 13B are restored, the virtual machines 13A and 13B need to respectively acquire information concerning the volumes accessed by the virtual machines 23A and 23B. Specifically, the virtual machine 13A acquires, from the virtual machine 23A, for example, information indicating that only the volume 15A corresponding to the volume 25A needs to be accessed. The virtual machine 13B acquires, from the virtual machine 23B, for example, information indicating that the volume 15C and a volume 15D depicted in FIG. 6 corresponding to the volume 25C and a volume 25D need to be accessed. As depicted in FIG. 6, the storage apparatus 15 reconfigures the configuration of the volumes in the storage apparatus 15 on the basis of the information acquired by the virtual machines 13A and 13B.

However, when, for example, a disaster occurs, in some case, although abnormality occurs in the virtual machine 13A and the virtual machine 13B, abnormality does not occur in the storage apparatus 15. Alternatively, in some case, the storage apparatus 15 is restored earlier than the virtual machine 13A and the virtual machine 13B. In this case, the storage apparatus 15 is unable to reconfigure the configuration of the volumes in the storage apparatus 15 until the virtual machine 13A and the virtual machine 13B are restored.

Figure 7:
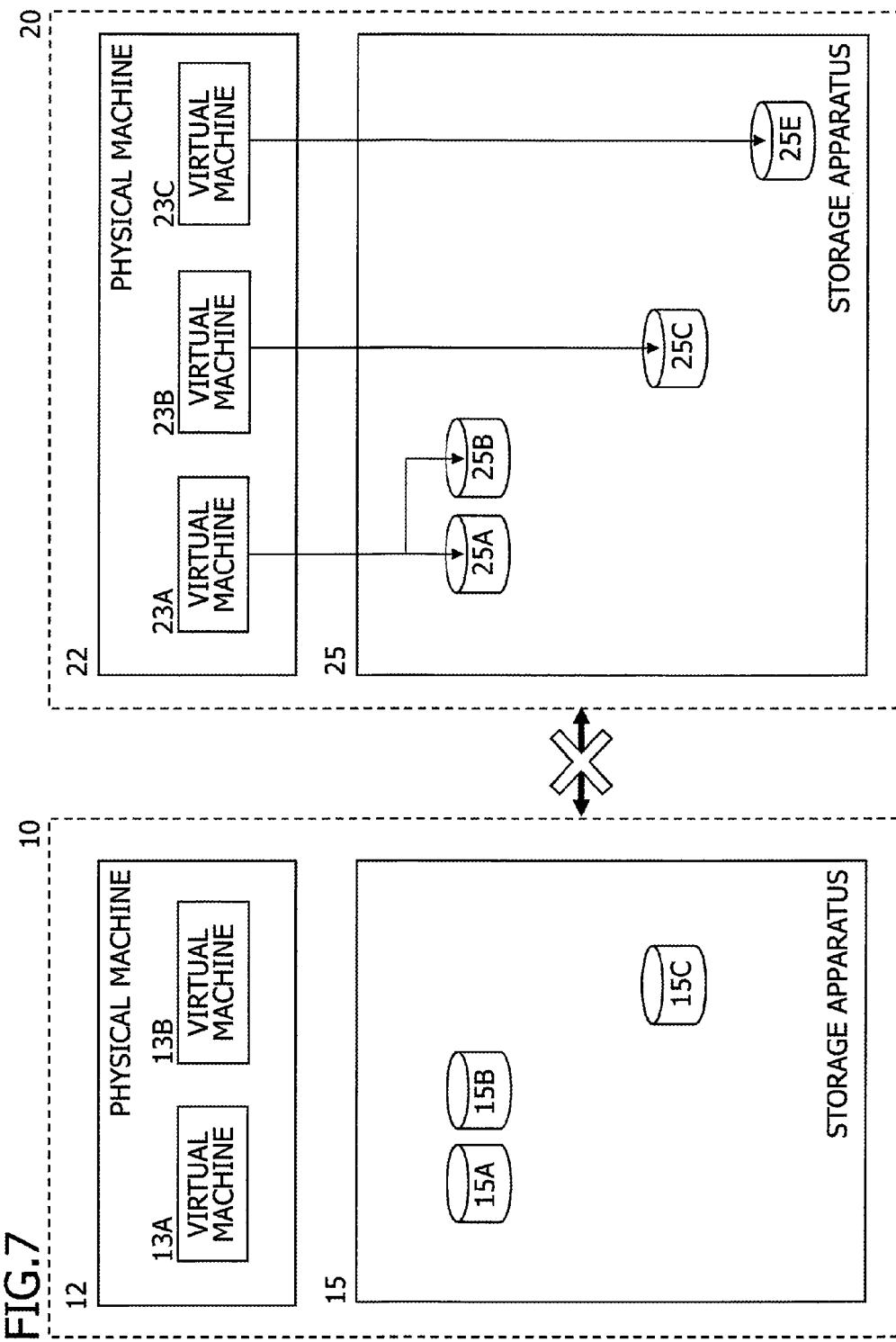
FIG. 7 is a diagram for explaining the configuration of the storage apparatuses.
Figure 8:
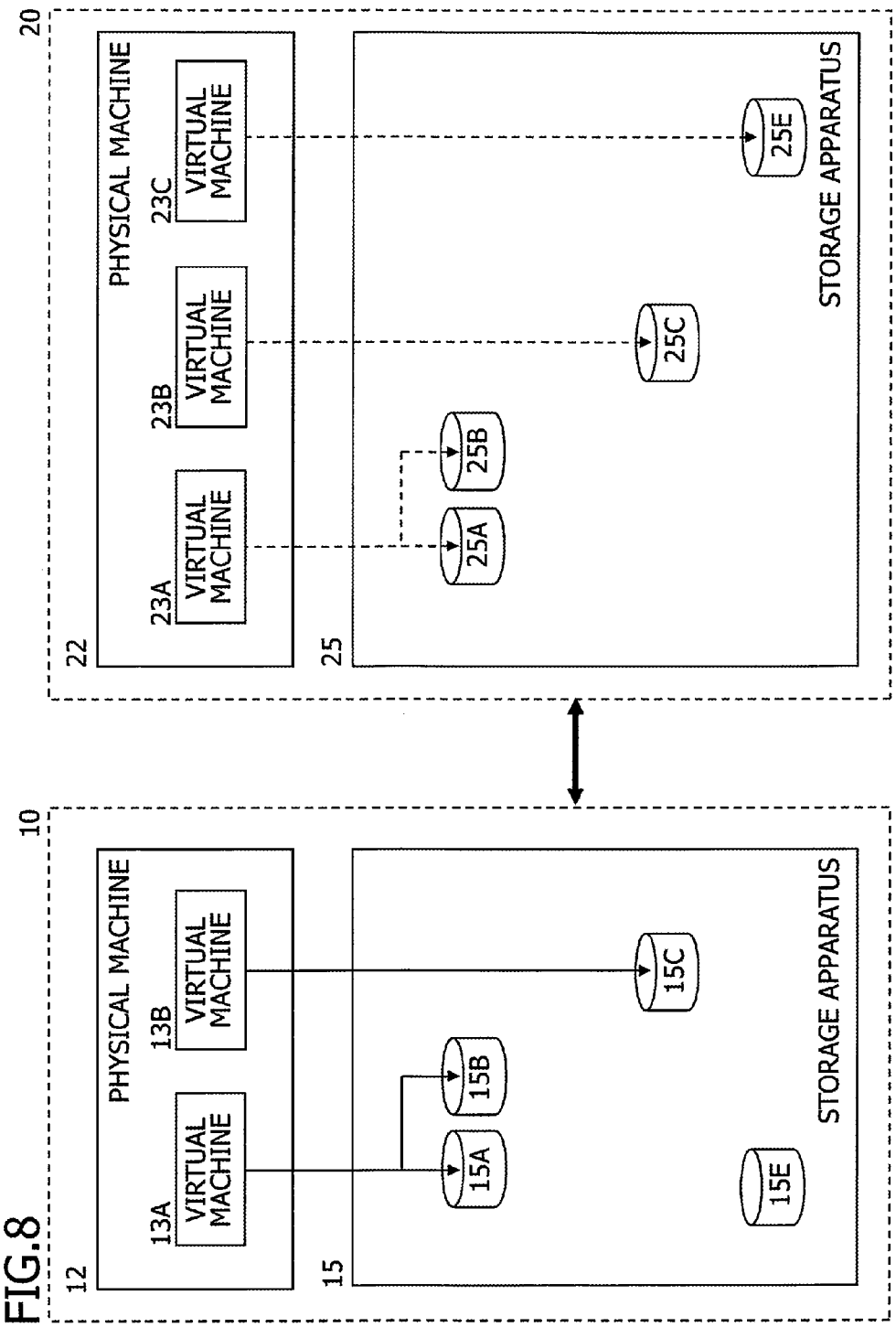
FIG. 8 is a diagram for explaining the configuration of the storage apparatuses.

As depicted in FIG. 7, in some case, a virtual machine (in an example depicted in FIG. 7, a virtual machine 23C) not present in the physical machine 12 but operating only in the physical machine 22 is present. In this case, information concerning a volume 25E accessed by the virtual machine 23C is included in information concerning the configuration of the storage apparatus 25. Therefore, as depicted in FIG. 8, when the configuration of the storage apparatus 15 is updated on the basis of the information concerning the configuration of the storage apparatus 25, the storage apparatus 15 sometimes creates a volume (in an example depicted in FIG. 8, a volume 15E) not needed by the virtual machines 13A and 13B.

Therefore, in this embodiment, when the virtual machines 23A and 23B execute processing executed by the virtual machines 13A and 13B, volumes in the storage apparatus 15 are reconfigured on the basis of information of volumes in the storage apparatus 25 accessed by the virtual machines 23A and 23B. Consequently, the storage apparatus 15 can reconfigure the volumes in the storage apparatus 15 without waiting for the execution of the processing by the virtual machines 13A and 13B. That is, even when the virtual machines 13A and 13B are not restored, the storage apparatus 15 can reconfigure the volumes in the storage apparatus 15.

Hardware Configuration of the Information Processing System

Figure 9:
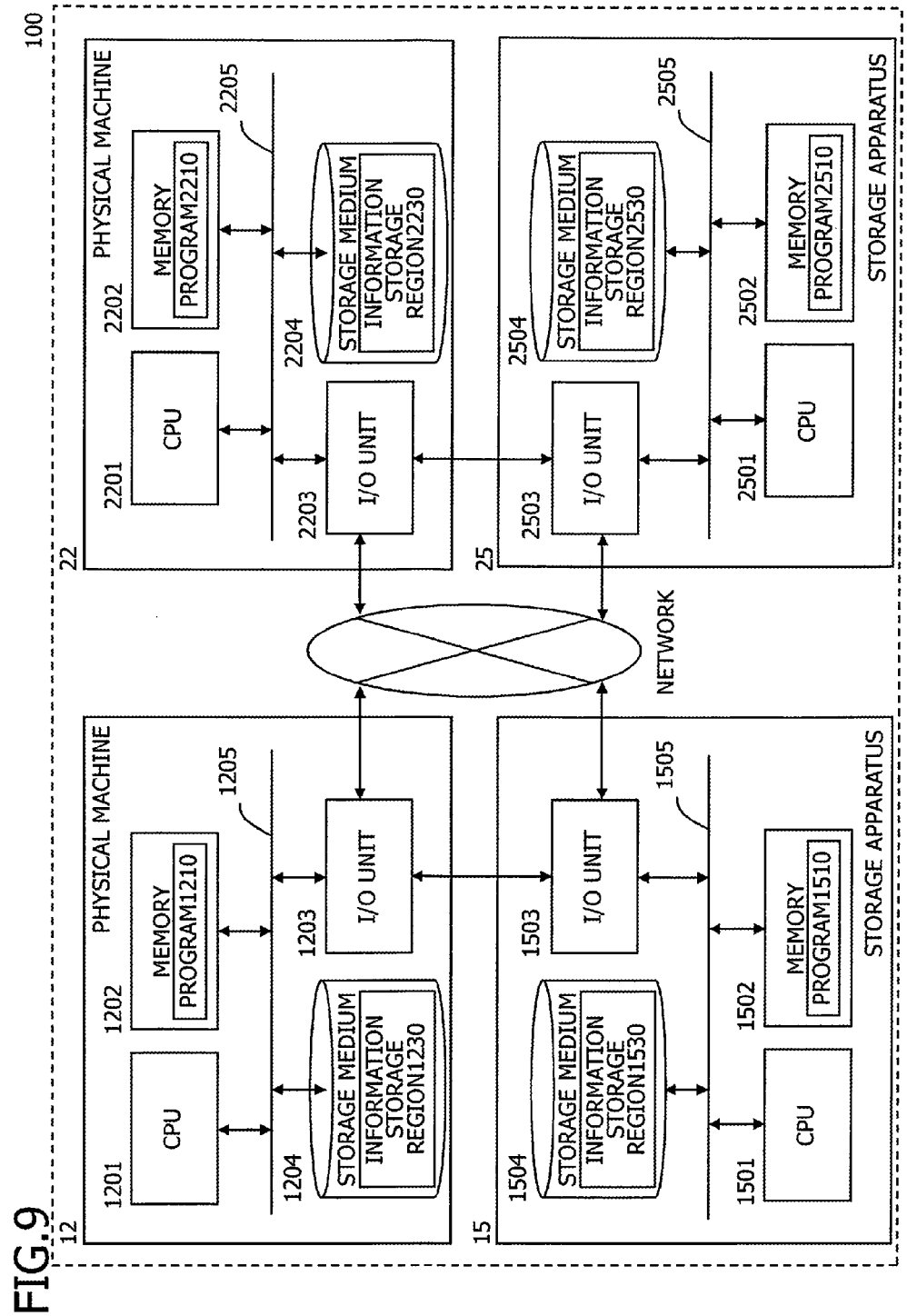
FIG. 9 is a diagram depicting the hardware configuration of the information processing system.

The configuration of the information processing system 100 is explained. FIG. 9 is a diagram depicting the hardware configuration of the information processing system. The information processing system 100 in an example depicted in FIG. 9 includes the physical machine 12 and the storage apparatus 15 set in the first site 10 and the physical machine 22 and the storage apparatus 25 set in the second site 20. In the example depicted in FIG. 9, the physical machine 12, the storage apparatus 15, the physical machine 22, and the storage apparatus 25 are accessible to one another via a network. Note that, in the following explanation, the virtual machines 13A and 13B are collectively also referred to as virtual machines 13 and the virtual machines 23A and 23B are collectively also referred to as virtual machines 23.

The physical machine 12 includes a CPU 1201, which is a processor, a memory 1202, an external interface (I/O unit) 1203, and a storage medium 1204. The units are connected to one another via a bus 1205. The storage medium 1204 stores, for example, in a program storage region (not depicted in the figure) in the storage medium 1204, a computer program 1210 for performing, for example, processing for taking over processing executed by the virtual machine 23 (hereinafter also referred to as switching processing). As depicted in FIG. 9, during the execution of the program 1210, the CPU 1201 loads the computer program 1210 to the memory 1202 from the storage medium 1204 and performs the switching processing or the like in cooperation with the computer program 1210. The storage medium 1204 includes, for example, an information storage region 1230 that stores information used in performing the switching processing or the like.

The storage apparatus 15 includes a CPU 1501, which is a processor, a memory 1502, an external interface (an I/O unit) 1503, and a storage medium 1504. The units are connected to one another via a bus 1505. The storage medium 1504 stores, for example, in a program storage region (not depicted in the figure) in the storage medium 1504, a computer program 1510 (hereinafter also referred to as reconfiguration program) for performing processing for reconfiguring volumes in the storage medium 1504 (hereinafter also referred to as reconfiguration processing). As depicted in FIG. 9, during the execution of the computer program 1510, the CPU 1501 loads the computer program 1510 to the memory 1502 from the storage medium 1504 and performs the reconfiguration processing in cooperation with the computer program 1510. The storage medium 1504 includes, for example, an information storage region 1530 that stores information accessed by virtual machines and information used in performing the reconfiguration processing. Note that, for example, the storage medium 1504 is divided into logical volumes and managed by a file system (not depicted in the figure) in the physical machine 12.

Like the physical machine 12, the physical machine 22 includes a CPU 2201, which is a processor, a memory 2202, an external interface (an I/O unit) 2203, and a storage medium 2204. The units are connected to one another via a bus 2205. The storage medium 2204 stores, for example, in a program storage region (not depicted in the figure) in the storage medium 2204, a computer program 2210 for performing, for example, processing for taking over processing executed by the virtual machines 13 (hereinafter also referred to as switching processing). As depicted in FIG. 9, during the execution of the program 2210, the CPU 2201 loads the computer program 2210 to the memory 2202 from the storage medium 2204 and performs the switching processing or the like in cooperation with the computer program 2210. The storage medium 2204 includes, for example, an information storage region 2230 that stores information used in performing the switching processing or the like.

The storage apparatus 25 includes a CPU 2501, which is a processor, a memory 2502, an external interface (an I/O unit) 2503, and a storage medium 2504. The units are connected to one another via a bus 2505. The storage medium 2504 stores, for example, in a program storage region (not depicted in the figure) in the storage medium 2504, a reconfiguration program 2510 for performing reconfiguration processing for volumes in the storage medium 2504. As depicted in FIG. 9, during the execution of the computer program 2510, the CPU 2501 loads the computer program 2510 to the memory 2502 from the storage medium 2504 and performs the reconfiguration processing in cooperation with the computer program 2510. The storage medium 2504 includes, for example, an information storage region 2530 that stores information accessed by virtual machines and information used in performing the reconfiguration processing. Note that, for example, the storage medium 2504 is divided into logical volumes and managed by a file system (not depicted in the figure) in the physical machine 22.

Software Configuration of the Storage Apparatus

Figure 10:
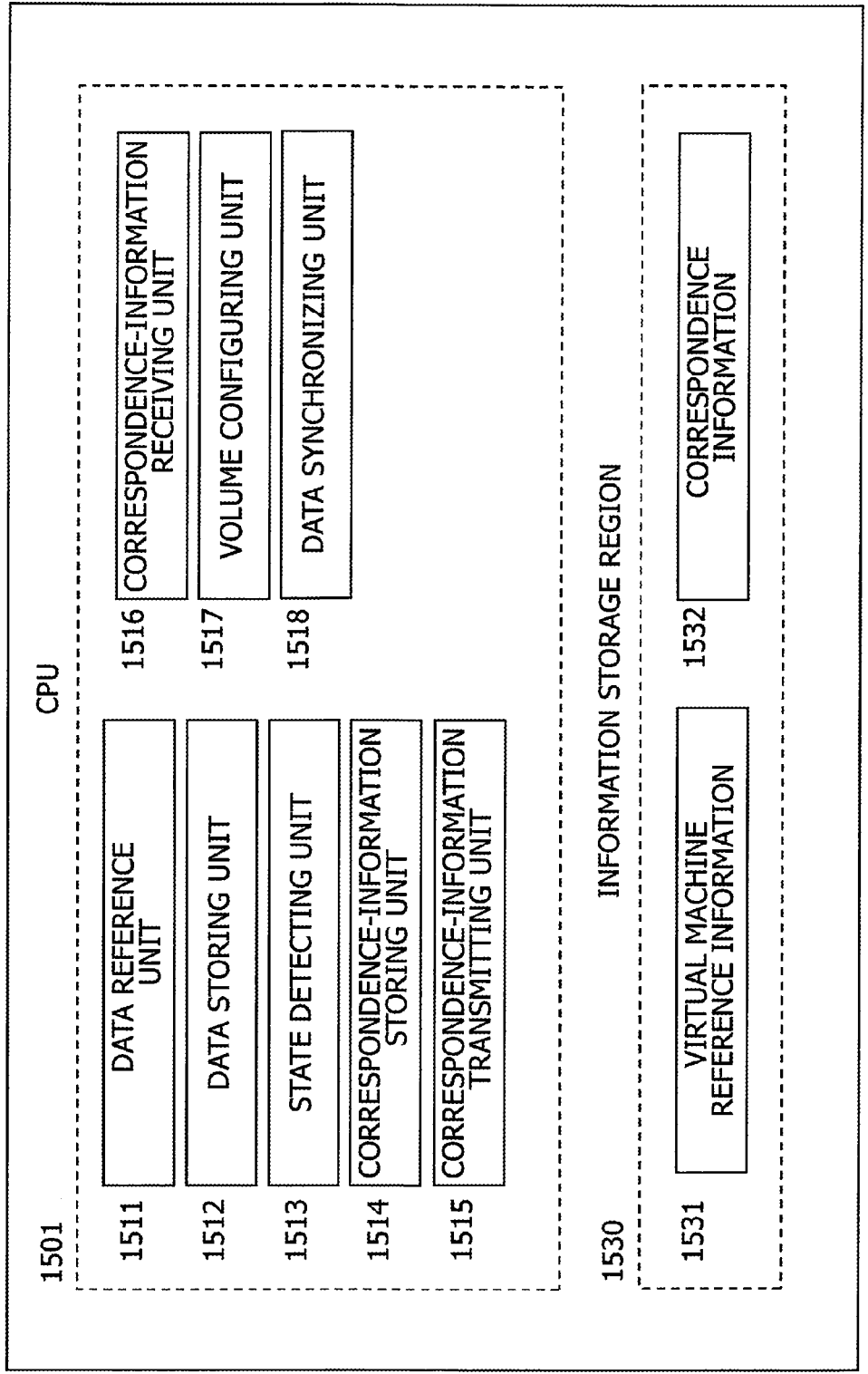
FIG. 10 is a functional block diagram of the storage apparatus depicted in FIG. 9.

FIG. 10 is a functional block diagram of the storage apparatus depicted in FIG. 9. Specifically, FIG. 10 is a functional block diagram of the storage apparatus 15 in the first site 10. The CPU 1501 cooperates with the computer program 1510 to thereby operate as, for example, a data reference unit 1511, a data storing unit 1512, a state detecting unit 1513, and a correspondence-information storing unit 1514. The CPU 1501 cooperates with the computer program 1510 to thereby operate as, for example, a correspondence-information transmitting unit 1515, a correspondence-information receiving unit 1516, a volume configuring unit 1517, and a data synchronizing unit 1518. In the information storage region 1530, for example, virtual machine reference information 1531 and correspondence information 1532 (hereinafter also referred to as second information 1532) are stored.

For example, when receiving an access request from the virtual machines 13 explained with reference to FIG. 1, the data reference unit 1511 accesses the virtual machine reference information 1531 corresponding to the received access request and returns acquired data to the transmission source of the access request. Note that the virtual machine reference information 1531 is an aggregate of data accessible by the virtual machines 13 and is stored in one or more volumes created by the volume configuring unit 1517 explained below.

For example, when receiving a data storage request from the virtual machines 13, the data storing unit 1512 stores, as the virtual machine reference information 1531, data corresponding to the received data storage request. For example, when receiving a data update request from the virtual machines 13, the data storing unit 1512 updates the virtual machine reference information 1531 stored in the information storage region 1530.

For example, when predetermined abnormality occurs in the second site 20, the state detecting unit 1513 detects the occurrence of the predetermined abnormality. Specifically, for example, when detecting that the second site 20 becomes inaccessible, the state detecting unit 1513 may determine that abnormality has occurred in the second site 20. For example, when the state detecting unit 1513 determines that the abnormality has occurred in the second site 20, the virtual machines 13 take over processing executed by the virtual machines 23 in the second site 20.

The correspondence-information storing unit 1514 creates, for example, correspondence information 1532 in which information for identifying the virtual machines 13 and information for identifying volumes accessed by the virtual machines 13 are associated. The correspondence-information storing unit 1514 stores, for example, the created correspondence information 1532 in the information storage region 1530. Specifically, for example, when the virtual machines 13 take over and execute the processing executed by the virtual machines 23 in the second site 20, the correspondence-information storing unit 1514 creates only the correspondence information 1532 concerning a virtual machine that is executing the processing executed by the virtual machines 23 in the second site 20 among the virtual machines 13.

The correspondence-information transmitting unit 1515 transmits, for example, the correspondence information 1532 stored by the correspondence-information storing unit 1514 to the storage apparatus 25. The correspondence-information receiving unit 1516 receives, for example, the correspondence information 2532 (correspondence information created by the storage apparatus 25).

The volume configuring unit 1517 determines, for example, whether there is a difference between the correspondence information 1532 created by the correspondence-information storing unit 1514 and the correspondence information 2532 received by the correspondence-information receiving unit 1516. When determining that there is a difference between these kinds of information, the volume configuring unit 1517 reconfigures the volumes in the storage apparatus 15 on the basis of information of the correspondence information 2532. The volume configuring unit 1517 may reconfigure the volumes in the storage apparatus 15 on the basis of only the correspondence information 2532 received by the correspondence-information receiving unit 1516.

The data synchronizing unit 1518 synchronizes, for example, the data stored in the storage apparatus 15 and the data stored in the storage apparatus 25. Specifically, the data synchronizing unit 1518 synchronizes the data, for example, after the volume configuring unit 1517 reconfigures the volumes.

Figure 11:
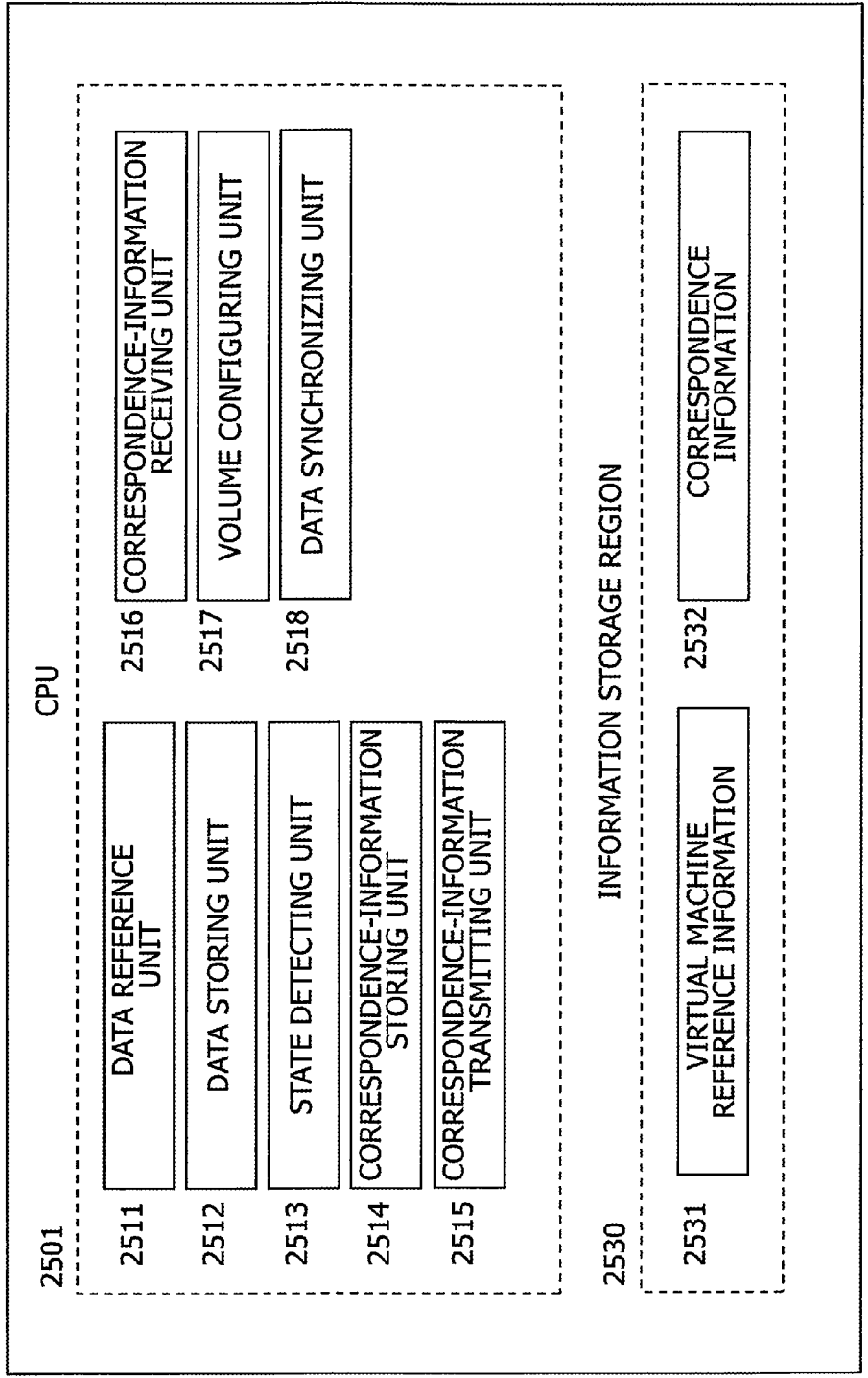
FIG. 11 is a functional block diagram of the storage apparatus depicted in FIG. 9.

FIG. 11 is a functional block diagram of the storage apparatus depicted in FIG. 9. Specifically, FIG. 11 is a functional block diagram of the storage apparatus 25 in the second site 20. The CPU 2501 cooperates with the computer program 2510 to thereby operate as, for example, a data reference unit 2511, a data storing unit 2512, a state detecting unit 2513, and a correspondence-information storing unit 2514. The CPU 2501 cooperates with the computer program 2510 to thereby operate as, for example, a correspondence-information transmitting unit 2515, a correspondence-information receiving unit 2516, a volume configuring unit 2517, and a data synchronizing unit 2518. In the information storage region 2530, for example, virtual machine reference information 2531 and correspondence information 2532 (hereinafter also referred to as first information 2532) are stored. Note that functions and information of the storage apparatus 25 are the same as the functions and the information of the storage apparatus 15 explained with reference to FIG. 10. Therefore, explanation of the functions and the information is omitted.

Overview of a First Embodiment

Figure 12:
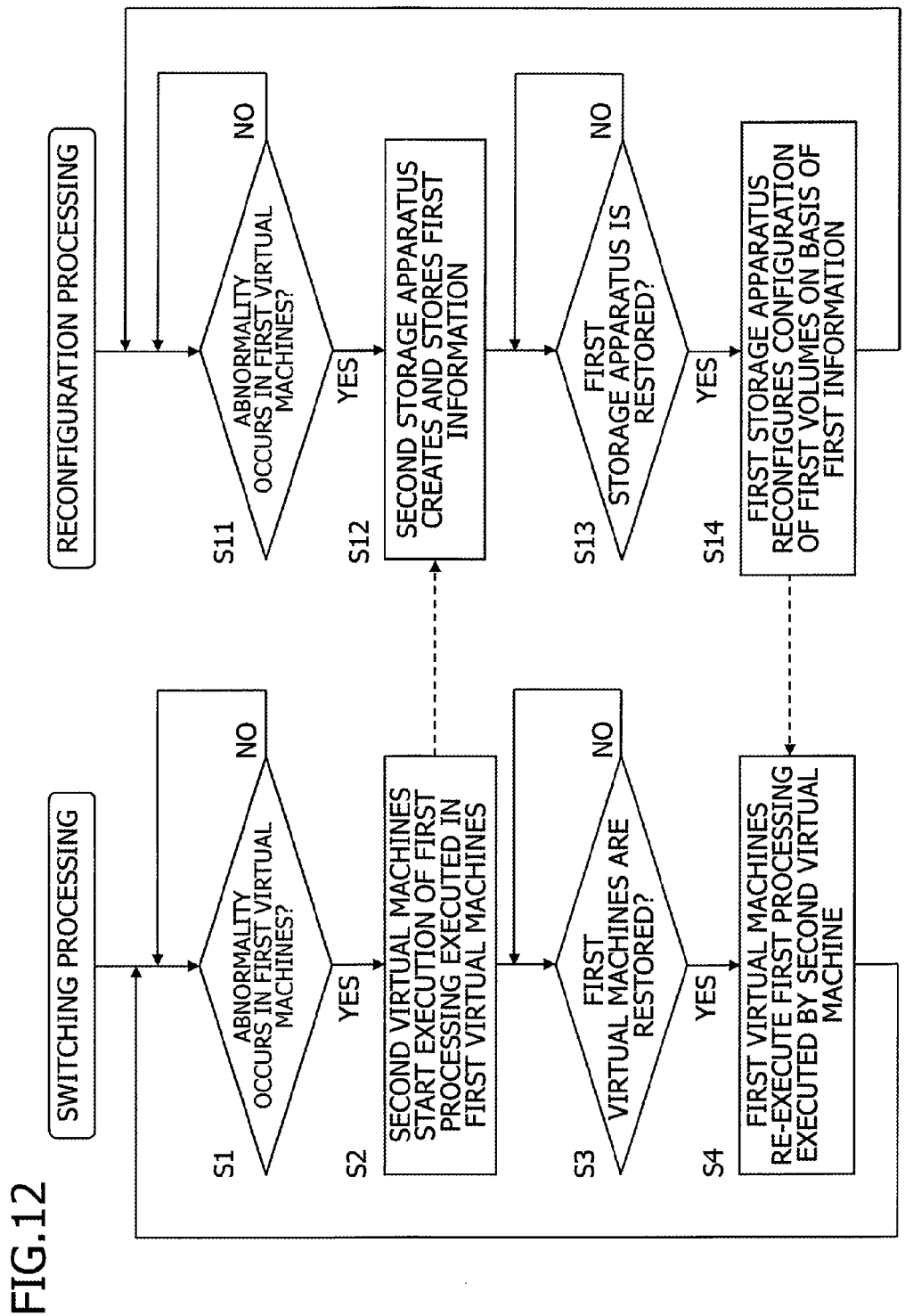
FIG. 12 is a flowchart for explaining overviews of switching processing and reconfiguration processing in the first embodiment.
Figure 13:
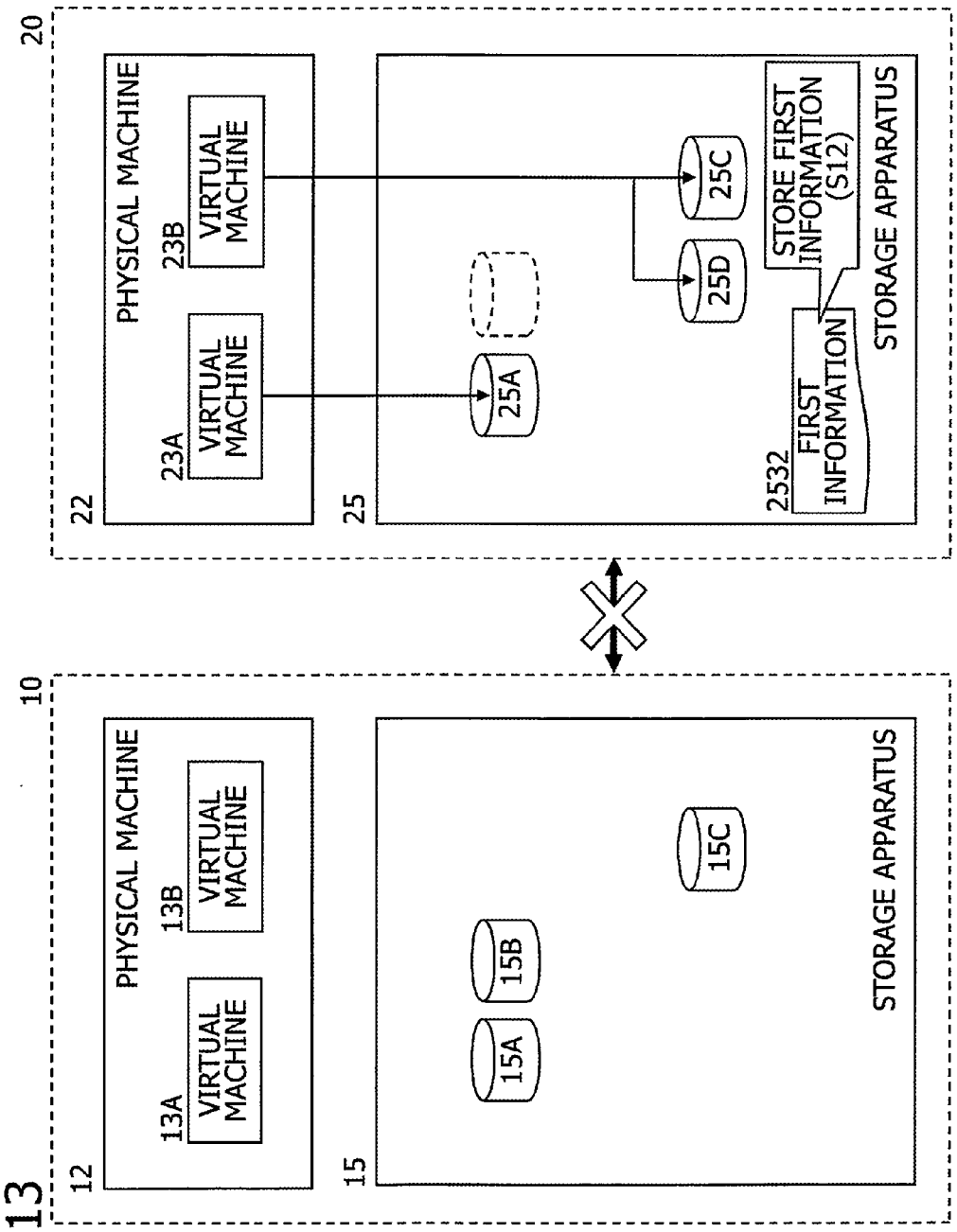
FIG. 13 is diagrams for explaining the overview of the reconfiguration processing in the first embodiment.
Figure 14:
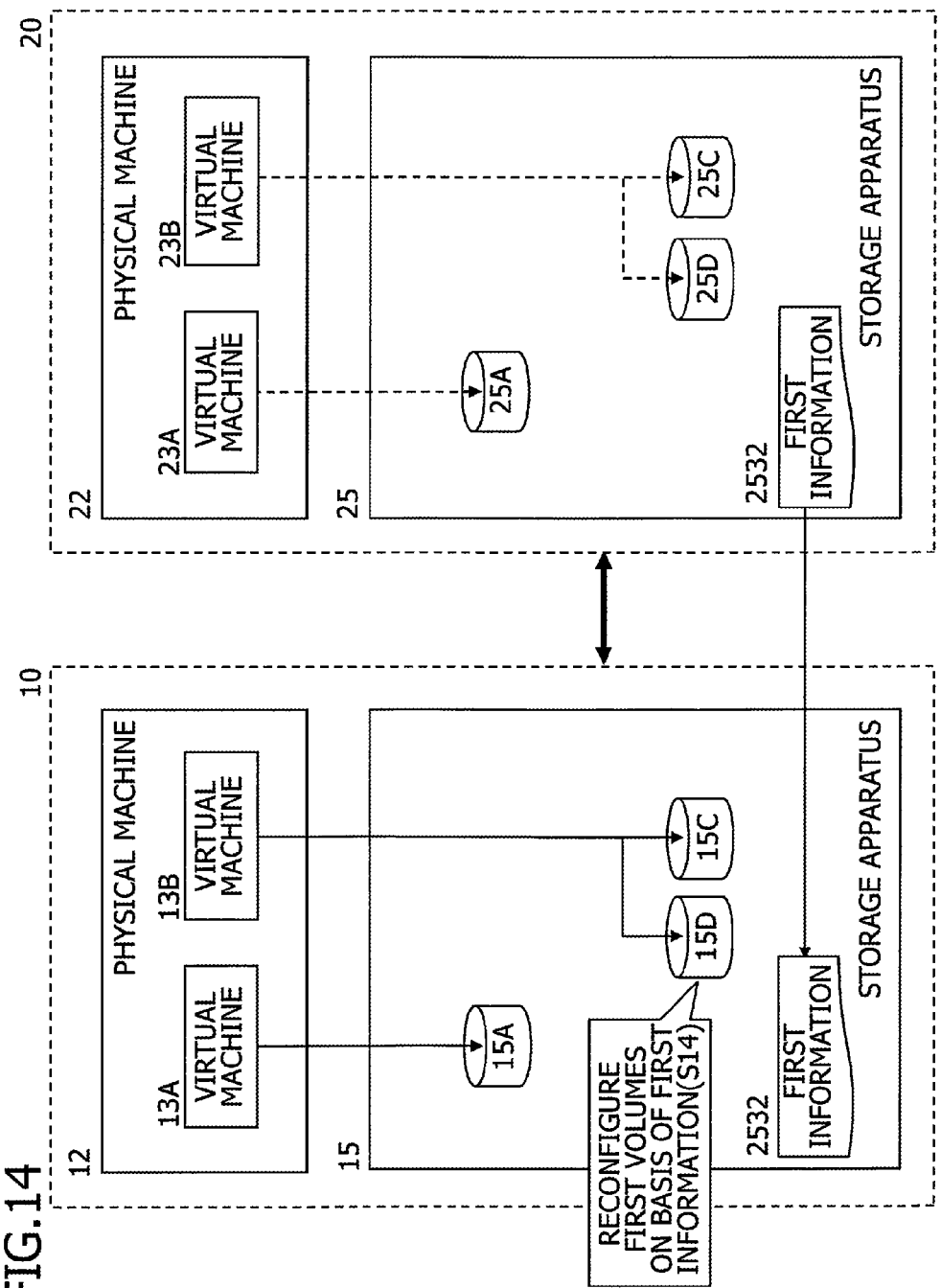
FIG. 14 is diagrams for explaining the overview of the reconfiguration processing in the first embodiment.

An overview of a first embodiment is explained. FIG. 12 is a flowchart for explaining overviews of switching processing and reconfiguration processing in the first embodiment. FIGS. 13 and 14 are diagrams for explaining the overview of the reconfiguration processing in the first embodiment. The overviews of the switching processing and the reconfiguration processing depicted in FIG. 12 are explained with reference to FIGS. 13 and 14. Note that, in the following explanation, abnormality occurs in the virtual machines 13.

First, the switching processing is explained with reference to a flowchart on the left side in FIG. 12. The switching processing in FIG. 12 is processing executed in the virtual machines 13 and the virtual machines 23. Specifically, the virtual machines 23 stay on standby, for example, until abnormality occurs in the virtual machines 13 (NO in S1). For example, the virtual machines 23 may periodically access the virtual machines 13 and, when failing in the access, determine that abnormality has occurred in the virtual machines 13.

If the virtual machines 23 determine that abnormality has occurred in the virtual machines 13 (YES in S1), the virtual machines 23 start, for example, the execution of processing executed in the virtual machines 13 (hereinafter also referred to as first processing) (S2). That is, when the virtual machines 23 become inaccessible to the virtual machines 13, it is likely that the virtual machines 13 are unable to continue the first processing. In this case, it is likely that services provided to users are affected. Therefore, when detecting the abnormality in the virtual machines 13, the virtual machines 23 take over the first processing executed in the virtual machines 13 and start the execution of the first processing. Thereafter, the virtual machines 23 stay on standby, for example, until the virtual machines 13 are restored (NO in S3).

Note that the operation administrator sometimes detects, according to, for example, an error output from the virtual machines 13, the occurrence of the abnormality in the virtual machines 13. In this case, the operation administrator may determine whether the virtual machines 23 need to perform the first processing. When determining that the virtual machines 23 need to execute the processing, the operation administrator may perform an operation for the virtual machines 23 to start the execution of the first processing.

If the virtual machines 13 are restored (YES in S3), the virtual machines 13 take over and re-execute the first processing executed by the virtual machines 23 (S4). Note that, for example, when the operation administrator performs an input indicating that the virtual machines 13 are restored, the virtual machines 23 may take over the first processing to the virtual machine 13. As explained below, the virtual machines 13 desirably perform the re-execution of the first processing after the reconfiguration of the volumes by the storage apparatus 15 (S14) is completed.

The reconfiguration processing is explained with reference to a flowchart on the right side of FIG. 12. The reconfiguration processing in FIG. 12 is processing executed in the storage apparatus 15 and the storage apparatus 25. Specifically, the storage apparatus 25 stays on standby, for example, until abnormality occurs in the virtual machines 13 (NO in S11). Specifically, as in the switching processing explained above, the storage apparatus 25 stays on standby, for example, until the virtual machines 23 detect that abnormality occurs in the virtual machines 13.

If the virtual machines 23 determine that abnormality occurs in the virtual machines 13 (YES in S11), as depicted in FIG. 13, the storage apparatus 25 creates and stores the correspondence information 2532, for example, after the virtual machines 23 start the execution of the first processing (S2 and S12). The correspondence information 2532 is, for example, information in which identification information of a virtual machine that executes the first processing among the virtual machines 23 and volumes accessed by the virtual machine that executes the first processing among the volumes in the storage apparatus 25 (hereinafter also referred to as second volumes) are associated. Specifically, the storage apparatus 25 may create the correspondence information 2532 using, as identification information of the virtual machines, World Wide Names (WWNs) of the virtual machines included in the storage apparatus 25. After detecting the occurrence of the abnormality in the virtual machines 13, the storage apparatus 25 may update the correspondence information 2532, for example, every time the configuration of the second volumes is changed. A specific example of the correspondence information 2532 is explained below. Thereafter, the storage apparatus 25 stays on standby, for example, until the storage apparatus 15 is restored (NO in S13). If the storage apparatus 15 is restored (YES in S13), the storage apparatus 15 configures, for example, as depicted in FIG. 14, the volumes in the storage apparatus 15 (hereinafter also referred to as first volumes) on the basis of the correspondence information 2532 (S14).

That is, when the virtual machines 23 take over and execute the first processing executed in the virtual machines 13, the configuration of the second volumes is sometimes different from the configuration of the first volumes at the time of switching of the first processing. In this case, the storage apparatus 15 needs to reconfigure the first volumes on the basis of information concerning the configuration of the second volumes. The storage apparatus 15 can reconfigure the first volumes before the restoration of the virtual machines 13 by directly acquiring the information concerning the configuration of the second volumes from the storage apparatus 25 and reconfiguring the first volumes. Therefore, for example, when abnormality does not occur in the storage apparatus 15 or when the storage apparatus 15 is restored earlier than the virtual machines 13, the storage apparatus 15 can reconfigure the volumes without waiting for the restoration of the virtual machines 13. Consequently, it is unnecessary to provide a line for transmitting and receiving the information concerning the configuration of the second volumes between the virtual machines.

Further, the storage apparatus 25 creates the correspondence information 2532 concerning volumes accessed by the virtual machine that is executing the first processing executed by the virtual machines 13 among the volumes in the storage apparatus 25. Therefore, the correspondence information 2532 does not include information concerning volumes accessed by the virtual machines 23 to execute original processing of the virtual machines 23.

As explained above, according to the first embodiment, when the virtual machines 23 execute the first processing executed by the virtual machines 13 according to occurrence of predetermined abnormality in the virtual machines 13, the storage apparatus 25 stores the correspondence information 2532. Before the virtual machines 13 re-execute the first processing, the storage apparatus 15 reconfigures the configuration of the first volumes to be the same as the configuration of the volumes corresponding to the correspondence information 2532 among the second volumes. Consequently, the storage apparatus 15 can reconfigure the volumes of the storage apparatus 15 irrespective of whether the virtual machines 13 are restored from the abnormality. The storage apparatus 15 and the storage apparatus 25 can prevent volumes not used by the virtual machines 13 from being created.

Details of the First Embodiment

Figure 15A:
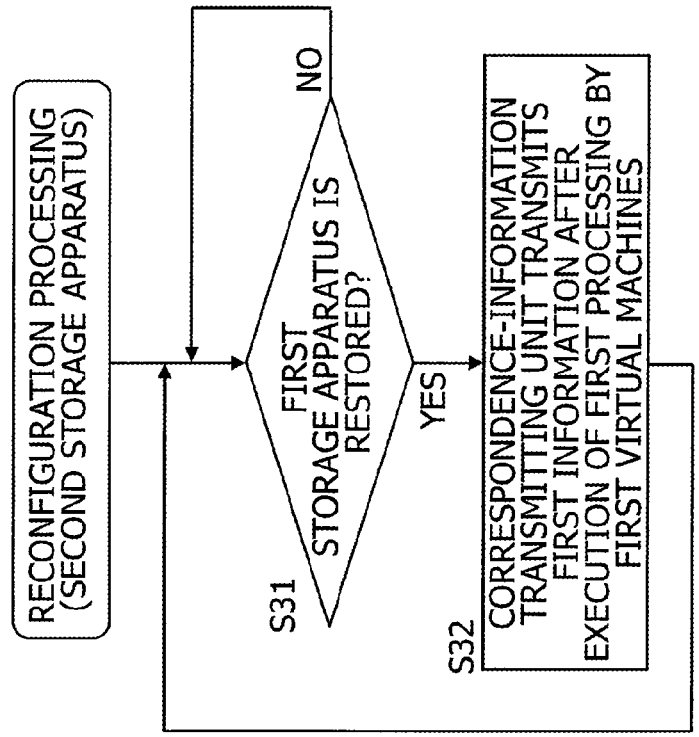
FIGS. 15A to 15B are flowcharts for explaining details of the reconfiguration processing in the first embodiment.
Figure 15B:
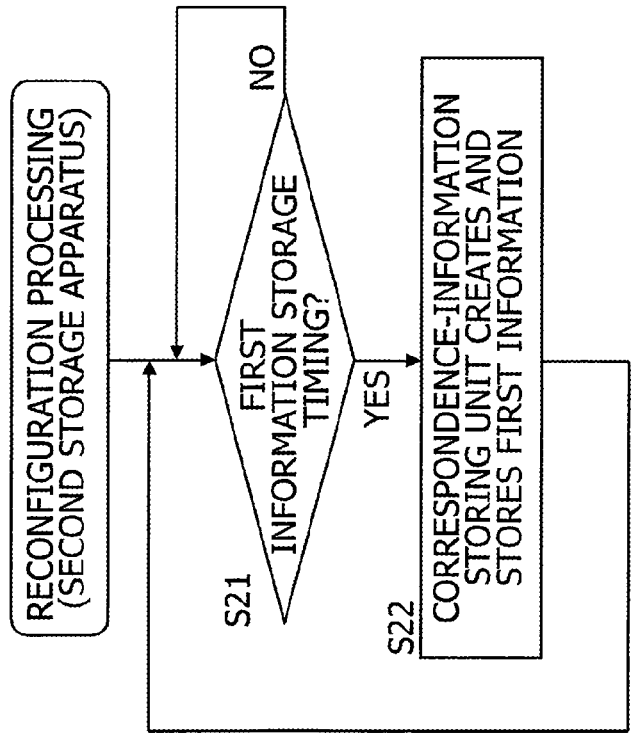
Figure 16:
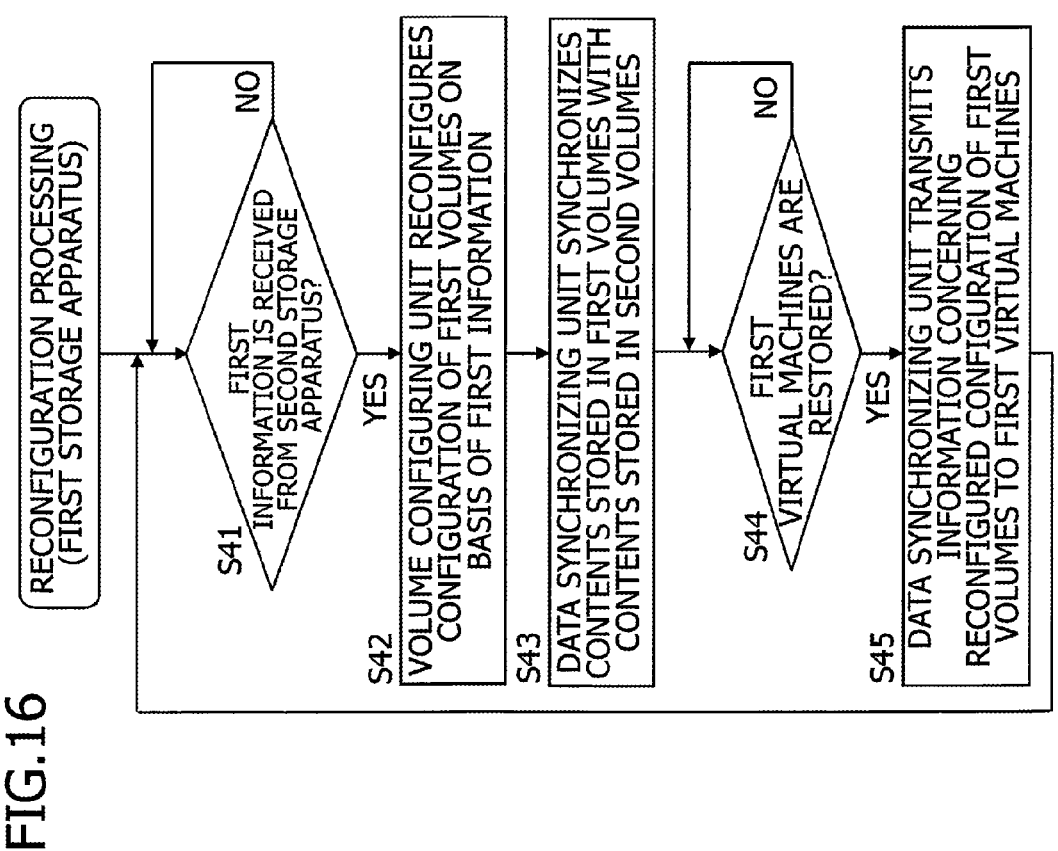
FIG. 16 is a flowchart for explaining details of the reconfiguration processing in the first embodiment.

Details of the first embodiment are explained. FIGS. 15A to 16 are flowcharts for explaining details of the reconfiguration processing in the first embodiment. FIGS. 17 to 19 are diagrams for explaining the details of the reconfiguration processing in the first embodiment. The details of the reconfiguration processing in FIGS. 15A to 16 are explained with reference to FIGS. 17 to 19.

Processing in the Second Storage Apparatus

First, the reconfiguration processing executed in the storage apparatus 25 is explained. The correspondence-information storing unit 2514 of the storage apparatus 25 stays on standby, for example, until timing for storing the correspondence information 2532 explained in FIG. 12 (NO in S21). The timing for storing the correspondence information 2532 may be, for example, every predetermined time (e.g., every one hour) after detection of abnormality of the virtual machines 13 or the storage apparatus 15. At the timing for storing the correspondence information 2532 (YES in S21), the correspondence-information storing unit 2514 creates, for example, the correspondence information 2532 and stores the correspondence information in the information storage region 2530 (S22).

The state detecting unit 2513 of the storage apparatus 25 stays on standby, for example, until the restoration of the storage apparatus 15 is detected (NO in S31). If the state detecting unit 2513 determines that the storage apparatus 15 is restored (YES in S31), the correspondence-information transmitting unit 2515 transmits, for example, the latest correspondence information 2532 created by the correspondence-information storing unit 2514 to the storage apparatus 15 (S32). Consequently, the storage apparatus 15 can acquire the correspondence information 2532 irrespective of whether the virtual machines 13 are restored. Even in a state in which the virtual machines 13 are not restored, the storage apparatus 15 can synchronize the volume configuration of the storage apparatus 15 and the volume configuration of the storage apparatus 25.

Processing in the First Storage Apparatus

The reconfiguration processing executed in the storage apparatus 15 is explained. The correspondence-information receiving unit 1516 of the storage apparatus 15 stays on standby, for example, until the correspondence information 2532 transmitted from the storage apparatus 25 is received (NO in S41). That is, the correspondence-information receiving unit 1516 can receive the correspondence information 2532 when abnormality does not occur in the storage apparatus 15 or when the storage apparatus 15 is restored from abnormality. If the correspondence-information receiving unit 1516 receives the correspondence information 2532 (YES in S41), the volume configuring unit 1517 reconfigures the volumes of the storage apparatus 15, for example, on the basis of the correspondence information 2532. Specifically, the volume configuring unit 1517 configures the volumes of the storage apparatus 15 to be the same as the configuration of the volumes of the storage apparatus 25.

Subsequently, the data synchronizing unit 1518 of the storage apparatus 15 synchronizes, for example, contents stored in the first volumes with contents stored in the second volumes (S43). That is, the volume configuring unit 1517 synchronizes the volume configurations of the storage apparatus 15 and the storage apparatus 25, whereby the data synchronizing unit 1518 can synchronize the data respectively stored in the storage apparatus 15 and the storage apparatus 25. The data synchronizing unit 1518 stays on standby, for example, the virtual machines 13 are restored (NO in S44). Thereafter, if the virtual machines 13 are restored (YES in S44), the data synchronizing unit 1518 transmits, for example, information concerning the reconfigured configuration of the first volumes to the virtual machines 13 (S45). The information concerning the configuration of the first volumes may be, for example, the correspondence information 2532 received from the storage apparatus 25. That is, for example, when the storage apparatus 15 is restored earlier than the virtual machines 13, the storage apparatus 15 reconfigures volumes that the virtual machines 13 after the restoration needs to access. Therefore, by receiving the information concerning the configuration of the first volumes after the restoration, the virtual machines 13 can access the volumes of the storage apparatus 15 on the basis of contents of the information. Therefore, it is possible to reduce time needed until the virtual machines 13 execute the first processing after the restoration of the virtual machines 13.

Specific Example of the Reconfiguration Processing

A specific example of the reconfiguration processing is described. FIGS. 17 to 19 are diagrams for explaining specific example of the correspondence information 2532. The example depicted in FIGS. 17 to 19 is an example of the correspondence information 2532 created in the second site 20 when abnormality occurs in the virtual machines in the first site 10. Note that, in the following explanation, the correspondence information 2532 includes virtual machine correspondence information indicating correspondence between the virtual machines in the first site 10 and the virtual machines in the second site 20 and volume correspondence information accessed by the virtual machines.

FIG. 17 is a diagram for explaining a specific example of the virtual machine correspondence information. The virtual machine correspondence information depicted in FIG. 17 includes, as items, a "group identification ID" for identifying a combination of the virtual machines on the first site 10 side and the virtual machines on the second site 20 side and a "primary physical machine ID" for identifying the physical machines in which the virtual machines are disposed on the first site 10 side. The virtual machine correspondence information depicted in FIG. 17 includes, as items, a "primary virtual machine ID" for identifying the virtual machines on the first site 10 side and a "secondary physical machine ID" for identifying the physical machines in which the virtual machines are disposed on the second site 20 side. Further, the virtual machine correspondence information depicted in FIG. 17 includes, as an item, a "secondary virtual machine ID" for identifying the virtual machines on the second site 20 side. Note that, in the example depicted in FIG. 17, the group identification ID corresponds to one primary physical machine ID and one secondary physical machine ID.

Specifically, in the example depicted in FIG. 17, for example, a virtual machine VM-1-1 on the first site 10 side corresponds to a virtual machine VM-2-1 on the second site 20 side. The group identification ID of these virtual machines is 1. The virtual machine VM-1-1 is created in a physical machine SV-1-1. The virtual machine VM-2-1 is created in a physical machine SV-2-1. That is, the virtual machine correspondence information depicted in FIG. 17 indicates that, for example, when abnormality occurs in the virtual machine VM-1-1, the virtual machine VM-2-1 takes over processing executed by the virtual machine VM-1-1. Note that information in which the group identification IDs are 2, 3, and 4 is the same as the information in which the group identification ID is 1. Therefore, explanation of the information is omitted.

FIGS. 18 and 19 are diagrams for explaining a specific example of the volume correspondence information. The volume correspondence information depicted in FIGS. 18 and 19 includes, as items, the "group identification ID" depicted in FIG. 17 and a "secondary volume" indicating a volume in which data accessed by the virtual machine indicated by the item "secondary virtual machine ID" in FIG. 17 is stored.

Specifically, the volume correspondence information depicted in FIG. 18 indicates that the virtual machine-2-1, the item "group identification ID" of which is 1, accesses volumes Vol-1-1-2, Vol-1-2-2, and Vol-1-3-2. Note that information in which the group identification IDs are 2, 3, and 4 is the same as the information in which the group identification ID is 1. Therefore, explanation of the information is omitted.

FIG. 19 is an example depicting the volume correspondence information in the case in which the volume configuration changes from the state depicted in FIG. 18. Specifically, in the example depicted in FIG. 19, information concerning a Volume Vol-1-4-2 is added to the state of the volume correspondence information depicted in FIG. 18. In the example depicted in FIG. 19, information concerning the volume Vol-1-2-2 and a volume Vol-3-2-2 is deleted from the state of the volume correspondence information depicted in FIG. 18. That is, the example indicates that, during the execution of the first processing by the virtual machines 23, an access to the volume Vol-1-4-2 is started anew and an access to the volume Vol-1-2-2 and the volume Vol-3-2-2 ends. Therefore, when the virtual machines in the first site 10 are restored from abnormality, for example, by receiving the volume correspondence information depicted in FIG. 19, the storage apparatus 15 can synchronize the volume configuration in the storage apparatus 15 and the volume configuration in the storage apparatus 25.

Second Embodiment

Figure 20:
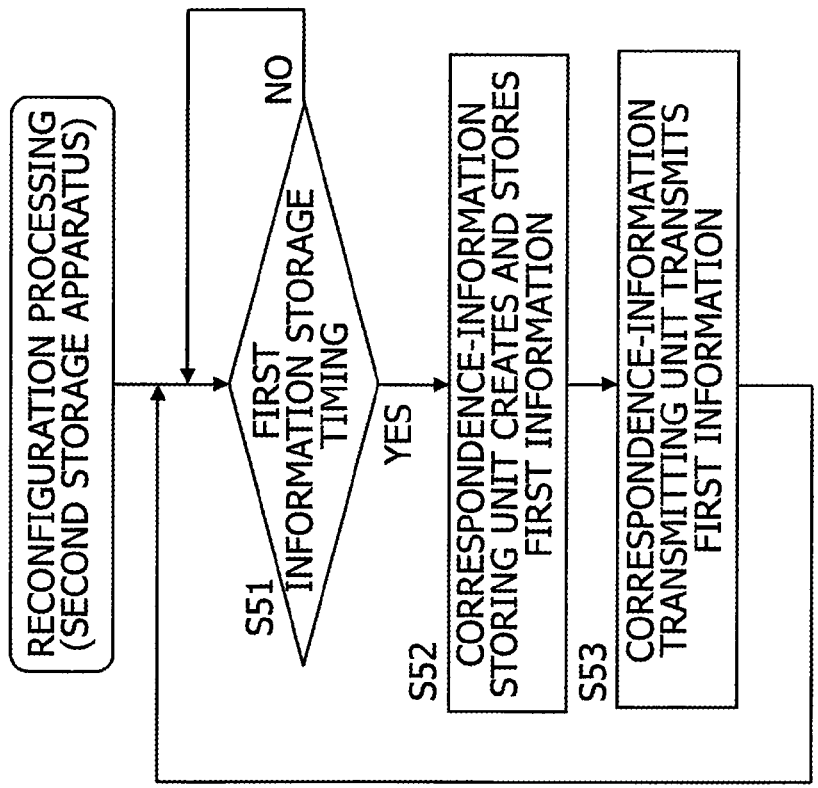
FIG. 20 is a flowchart for explaining reconfiguration processing in the second embodiment.
Figure 21B:
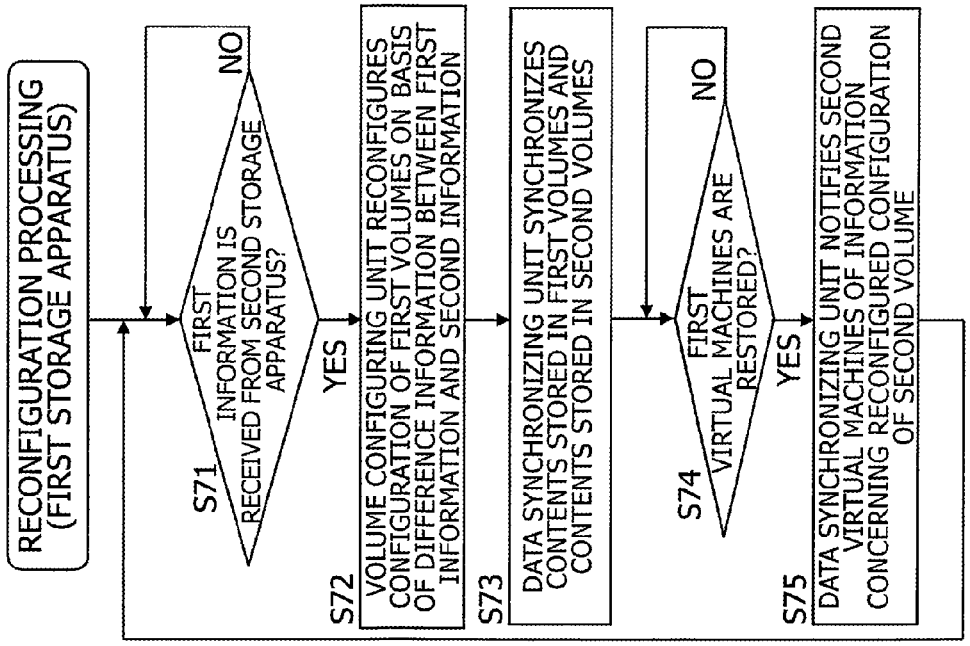
FIGS. 21A to 21B are flowcharts for explaining reconfiguration processing in the second embodiment.
Figure 21A:
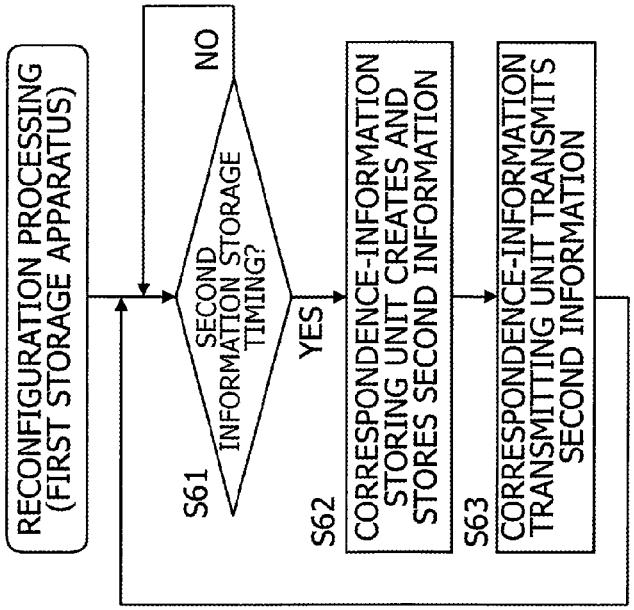

A second embodiment is explained. FIGS. 20 to 21B are flowcharts for explaining reconfiguration processing in the second embodiment.

In the second embodiment, differently from the first embodiment, the storage apparatus 15 creates the correspondence information 1532. The storage apparatus 15 transmits the correspondence information 1532 to the storage apparatus 25, for example, at every predetermined time interval. The storage apparatus 25 transmits the correspondence information 2532 to the storage apparatus 15. Consequently, the storage apparatus 15 and the storage apparatus 25 can always check and synchronize the volume configurations thereof irrespective of whether abnormality occurs.

Even when abnormality occurs in the virtual machines 13 or the storage apparatus 15, the storage apparatus 25 continues the creation of the correspondence information 2532. Further, when the storage apparatus 15 is restored from the abnormality, the storage apparatus 25 transmits the latest correspondence information 2532 to the storage apparatus 15. Thereafter, the storage apparatus 15 acquires difference information between the received correspondence information 2532 and the correspondence information 1532 during the abnormality occurrence and updates the first volumes. Consequently, the storage apparatus 15 can quickly update the first volumes on the basis of the acquired difference information. Since both of the storage apparatus 15 and the storage apparatus 25 create the correspondence information, even when abnormality occurs in the virtual machines 23, it is possible to reconfigure the second volumes on the basis of the correspondence information 1532 created by the virtual machines 13. Details of the reconfiguration processing in the second embodiment are explained below.

Processing in the Second Storage Apparatus

First, the reconfiguration processing executed in the storage apparatus 25 is explained. The correspondence-information storing unit 2514 stays on standby until timing for storing the correspondence information 2532 (NO in S51). At the timing for storing the correspondence information 2532 (YES in S51), the correspondence-information storing unit 2514 creates, for example, the correspondence information 2532 and stores the correspondence information 2532 in the information storage region 2530 (S52). Thereafter, the correspondence-information transmitting unit 2515 transmits, for example, the correspondence information 2532 created by the correspondence-information storing unit 2514 to the storage apparatus 15 (S53). That is, in the second embodiment, differently from the first embodiment, the correspondence information is steadily created irrespective of occurrence of abnormality in the virtual machines and the like. The storage apparatus 15 and the storage apparatus 25 transmit, for example, the correspondence information to each other to thereby synchronize the volume configurations thereof.

Processing in the First Storage Apparatus

The reconfiguration processing executed in the storage apparatus 15 is explained. As in the storage apparatus 25, the correspondence-information storing unit 1514 stays on standby, for example, until timing for storing the correspondence information 1532 (NO in S61). At the timing for storing the correspondence information 1532 (YES in S61), the correspondence-information storing unit 1514 creates, for example, the correspondence information 1532 and stores the correspondence information 1532 in the information storage region 1530 (S62). Thereafter, the correspondence-information transmitting unit 1515 transmits, for example, the correspondence information 1532 created by the correspondence-information storing unit 1514 to the storage apparatus 25 (S63). That is, differently from the first embodiment, like the storage apparatus 25, the storage apparatus 15 in the second embodiment creates the correspondence information 1532. Consequently, when abnormality occurs in the virtual machines 23, after restoration from the abnormality, it is possible to reconfigure the storage apparatus 25 on the basis of the correspondence information 1532 created by the virtual machines 13. Therefore, when the virtual machines 13 and the virtual machines 23 are performing different kinds of processing, when a failure occurs in the virtual machines and the like of one of the virtual machines 13 and the virtual machines 23, it is possible to switch processing executed by the virtual machines to the other virtual machines.

The correspondence-information receiving unit 1516 stays on standby, for example, until the correspondence-information receiving unit 1516 receives the correspondence information 2532 transmitted from the storage apparatus 25 (NO in S71). That is, the virtual machines 13, in which abnormality occurs, start, after restoration, processing same as processing before the abnormality occurrence. Therefore, like before the abnormality occurrence, the first information is received and the volume configuration of the storage apparatus 15 and the volume configuration of the storage apparatus 25 are synchronized as explained below. If the correspondence-information receiving unit 1516 receives the correspondence information 2532 (YES in S71), the volume configuring unit 1517 extracts, for example, difference information between the correspondence information 1532 and the correspondence information 2532. Further, the volume configuring unit 1517 reconfigures the first volumes on the basis of the extracted difference information (S72). Specifically, the volume configuring unit 1517 deletes volumes, information of which is included in the correspondence information 1532 but is not included in the correspondence information 2532. The volume configuring unit 1517 adds volumes, information of which is included in the correspondence information 2532 but is not included in the correspondence information 1532. Consequently, the volume configuring unit 1517 can reduce time and costs needed to reconfigure the first volumes.

Subsequently, the data synchronizing unit 1518 of the storage apparatus 15 synchronizes, for example, contents stored in the first volumes with contents stored in the second volumes (S73). The data synchronizing unit 1518 stays on standby, for example, until the virtual machines 13 are restored (NO in S74). Thereafter, if the virtual machines 13 are restored (YES in S74), the data synchronizing unit 1518 transmits, for example, information concerning the reconfigured configuration of the first volumes to the virtual machines 13 (S75).

Specific Example of the Reconfiguration Processing

A specific configuration of the reconfiguration processing is explained. FIGS. 22A to 23B are diagrams for explaining specific examples of the correspondence information 1532 and 2532. In the following explanation, the correspondence information 1532 and 2532 include virtual machine correspondence information indicating correspondence between the virtual machines in the first site 10 and the virtual machines in the second site 20 and volume correspondence information accessed by the virtual machines. Note that contents of the virtual machine correspondence information in the second embodiment are the same as the contents explained with reference to FIG. 17. Therefore, explanation of the virtual machine correspondence information is omitted.

First, FIGS. 22A and 22B are diagrams for explaining a specific example of volume correspondence information before abnormality occurrence. FIG. 22A is an example of the correspondence information 1532 created by the storage apparatus 15. FIG. 22B is an example of the correspondence information 2532 created by the storage apparatus 25.

Specifically, the example depicted in FIG. 22A indicates that the virtual machine on the first site 10 side, the item "group identification ID" of which is 1, accesses volumes Vol-1-1-1, Vol-1-2-1, and Vol-1-3-1. The example indicates that the virtual machine on the second site 20 side, the item "group identification ID" of which is 1, accesses the volumes Vol-1-1-2, Vol-1-2-2, and Vol-1-3-2. The example indicates that volumes stored in the same row are volumes in which contents respectively stored therein are synchronized. That is, information stored in the volume Vol-1-1-1 and information stored in the volume Vol-1-1-2 are synchronized. Note that information in which the group identification IDs are 2, 3, and 4 are the same as the information in which the group identification ID is 1. Therefore, explanation of the information is omitted.

The correspondence information 2532 depicted in FIG. 22B includes information same as the information of the correspondence information 1532 depicted in FIG. 22A. That is, the storage apparatus 15 and the storage apparatus 25 transmit and receive correspondence information each other before abnormality occurrence and synchronize the configurations in the storage apparatuses on the basis of the correspondence information. Therefore, in the examples depicted in FIGS. 22A and 22B, the correspondence information 1532 and the correspondence information 2532 includes the same information.

FIGS. 23A and 23B are diagrams for explaining specific examples of volume correspondence information after abnormality occurrence. FIG. 23A is an example of the correspondence information 1532 created by the storage apparatus 15. FIG. 23B is an example of the correspondence information 2532 created by the storage apparatus 25. For example, when abnormality occurs in the virtual machines 13, the update of the storage apparatus 15 by the virtual machines 13 stops. Therefore, the correspondence information 1532 depicted in FIG. 23A is not updated from the state of the correspondence information 1532 depicted in FIG. 22A.

On the other hand, even when abnormality occurs in the virtual machines 13, the virtual machines 23 update the storage apparatus 25. Therefore, when abnormality occurs in the virtual machines 13, differently from the case of FIGS. 22A and 22B, contents of the correspondence information 1532 and contents of the correspondence information 2532 are different. Specifically, in the example depicted in FIG. 23B, information concerning the volume Vol-1-4-2 is added to the state of the volume correspondence information depicted in FIG. 22B. In the example depicted in FIG. 23B, information concerning the volume Vol-1-2-2 and the volume Vol-3-2-2 are deleted from the state of the volume correspondence information depicted in FIG. 22B. That is, the example indicates that, according to the execution of the first processing by the virtual machines 23, an access to the volume Vol-1-4-2 is started and an access to the volume Vol-1-2-2 and the volume Vol-3-2-2 ends.

Consequently, the storage apparatus 15 can acquire difference information on the basis of, for example, information concerning a secondary volume of the correspondence information 2532 depicted in FIG. 23B and information concerning a primary volume of the correspondence information 1532 depicted in FIG. 23A. The storage apparatus 15 can synchronize the volume configuration of the storage apparatus 15 with the volume configuration of the storage apparatus 25 on the basis of the acquired difference information.

That is, according to the second embodiment, the volume configuring unit 1517 reconfigures the first volumes with reference to the difference information between the correspondence information 1532 created by the storage apparatus 15 and the correspondence information 2532 created by the storage apparatus 25. Consequently, it is possible to reconfigure the volumes in time shorter than time for reconfiguring the first volumes with reference to only the correspondence information 2532 created by the storage apparatus 25.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
a first storage apparatus; and
a second storage apparatus,
the second storage apparatus includes:
a second storage accessible by second virtual machines disposed in a second physical machine; and
a second processor configured to store, in accordance with occurrence of predetermined abnormality in first virtual machines disposed in a first physical machine or the first storage apparatus, when the second virtual machines, instead of the first virtual machines, execute first processing first information in which information for identifying virtual machines that execute the first processing among the second virtual machines and information for identifying storage regions accessed by the identified virtual machines during the execution of the first processing are associated with each other, and
the first storage apparatus includes:
a first storage accessible by the first virtual machines; and
a first processor configured to
store, before the predetermined abnormality occurs, when the first virtual machines execute the first processing, second information in which information for identifying the first virtual machines and storage regions accessed by the first virtual machines are associated with each other, and
reconfigure, before the first virtual machines re-execute the first processing, based on difference information between the first information and the second information, a configuration of the first storage to be a same configuration as a configuration of storage regions corresponding to the first information which is stored by the second processor in accordance with the execution of the first processing.

2. The information processing system according to claim 1, wherein, after reconfiguring the first storage, the first processor synchronizes contents stored in the first storage with contents stored in the second storage.

3. The information processing system according to claim 1, wherein, when communication with the first storage apparatus becomes impossible, the second processor determines that the predetermined abnormality has occurred.

4. The information processing system according to claim 1, wherein,
the second processor transmits the first information to the first storage apparatus, and
the first processor reconfigures the configuration of the first storage based on difference information between the first information received by the second processor and the second information.

5. The information processing system according to claim 1, wherein,
the first processor determines that storage regions in which information is included only in the first information among the first information and the second information are first storage regions accessed by a virtual machines executing the first processing,
the first processor determines that storage regions in which information is included only in the second information among the first information and the second information are second storage regions not accessed by a virtual machines executing the first processing, and
the first processor reconfigures the configuration of the first storage by including the first storage regions in the first storage and excluding the second storage regions from the first storage.

6. A second storage apparatus comprising:
a second storage accessible by second virtual machines disposed in a second physical machine and
a processor configured to
store, in accordance with occurrence of predetermined abnormality in first virtual machines disposed in a first physical machine or first storage apparatus accessible by the first virtual machines, when the second virtual machines, instead of the first virtual machines, execute first processing first information in which information for identifying virtual machines that execute the first processing among the second virtual machines and information for identifying storage regions accessed by the identified virtual machines during the execution of the first processing are associated with each other, the first storage apparatus storing, before the predetermined abnormality occurs, when the first virtual machines execute the first processing, second information in which information for identifying the first virtual machines and storage regions accessed by the first virtual machines are associated with each other, and transmit, before the first virtual machines re-execute the first processing, the first information which is stored in accordance with the execution of the first processing to the first storage apparatus to reconfigure a configuration of a first storage, included in the first storage apparatus, accessible by the first virtual machines to be a same configuration as a configuration of storage regions corresponding to the first information based on difference information between the first information and the second information.

7. A first storage apparatus comprising:

a first storage accessible by first virtual machines disposed in a first physical machine and a processor configured to store, before predetermined abnormality in the first virtual machines or the first storage apparatus occurs, when the first virtual machines execute the first processing, second information in which information for identifying the first virtual machines and storage regions accessed by the first virtual machines are associated with each other, receive, before the first virtual machines re-execute the first processing, execute first processing from second storage apparatus accessible by the second virtual machines, first information in which information for identifying virtual machines that execute the first processing among the second virtual machines and information for identifying storage regions accessed by the identified virtual machines during the execution of the first processing are associated with each other, and reconfigure, before the first virtual machines re-execute the first processing, based on difference information between the first information and the second information, a configuration of the first storage to be a same configuration as a configuration of storage regions corresponding to the first information which is stored in accordance with the execution of the first processing.

* * * * *